(12) United States Patent
Taniguchi et al.

(10) Patent No.: US 12,516,977 B2
(45) Date of Patent: Jan. 6, 2026

(54) SPECTRAL SENSITIVITY MEASURING DEVICE AND SPECTRAL SENSITIVITY MEASURING METHOD

(71) Applicant: SONY SEMICONDUCTOR SOLUTIONS CORPORATION, Kanagawa (JP)

(72) Inventors: Ryouji Taniguchi, Kanagawa (JP); Soichi Kuwahara, Kanagawa (JP); Junichi Miyashita, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 15 days.

(21) Appl. No.: 18/292,991

(22) PCT Filed: Feb. 9, 2022

(86) PCT No.: PCT/JP2022/005124
§ 371 (c)(1),
(2) Date: Jan. 29, 2024

(87) PCT Pub. No.: WO2023/032256
PCT Pub. Date: Mar. 9, 2023

(65) Prior Publication Data
US 2024/0255350 A1 Aug. 1, 2024

(30) Foreign Application Priority Data
Sep. 3, 2021 (JP) .................................. 2021-144243

(51) Int. Cl.
*G01J 3/28* (2006.01)
*G01J 3/02* (2006.01)
*G06T 7/00* (2017.01)

(52) U.S. Cl.
CPC .............. *G01J 3/027* (2013.01); *G01J 3/2823* (2013.01); *G06T 7/0002* (2013.01); *G01J 2003/2826* (2013.01); *G06T 2207/10024* (2013.01)

(58) Field of Classification Search
CPC .. G01J 3/027; G01J 3/2823; G01J 2003/2826; G06T 7/0002; G06T 2207/10024
See application file for complete search history.

(56) References Cited

U.S. PATENT DOCUMENTS 5,411,493 A * 5/1995 Rodriguez ................ A61F 7/02
604/290
6,423,047 B1 * 7/2002 Webster ................ A61F 13/505
604/397
(Continued)

FOREIGN PATENT DOCUMENTS

DE 102017119944 A1 2/2019
EP 957643 A1 11/1999
(Continued)

OTHER PUBLICATIONS

International Search Report and Written Opinion of PCT Application No. PCT/JP2022/005124, issued on Mar. 29, 2022, 12 pages of ISRWO.

*Primary Examiner* — Michael B. Pierorazio
(74) *Attorney, Agent, or Firm* — CHIP LAW GROUP

(57) ABSTRACT

Provided is a spectral sensitivity measuring device capable of accurately measuring a spectral sensitivity of an imaging device. The spectral sensitivity measuring device according to the present technology includes: a chart generation system that generates a chart including at least one chart portion having at least one color region at a position opposed to an imaging device; and a processing system that calculates a spectral sensitivity of the imaging device on the basis of a captured image, by the imaging device, of the chart gener- (Continued)

ated at the position opposed to the imaging device. According to the spectral sensitivity measuring device according to the present technology, it is possible to provide a spectral sensitivity measuring device capable of accurately measuring the spectral sensitivity of the imaging device.

26 Claims, 25 Drawing Sheets

(56) References Cited

U.S. PATENT DOCUMENTS

| | | | | |
|---|---|---|---|---|
| 6,982,780 | B2* | 1/2006 | Morley | H04N 21/41415 352/38 |
| 7,947,442 | B2* | 5/2011 | Iten | G01J 3/0218 422/82.07 |
| 8,483,393 | B2* | 7/2013 | Robert | H04N 21/63345 380/278 |
| 9,301,020 | B2* | 3/2016 | Sun | H04N 21/8456 |
| 9,584,874 | B1* | 2/2017 | Farías | H04N 21/44213 |
| 10,060,793 | B2* | 8/2018 | Craig | G01J 3/027 |
| 10,104,445 | B2* | 10/2018 | Patel | G11B 27/10 |
| 10,681,431 | B2* | 6/2020 | Levy | H04N 21/2381 |
| 10,820,066 | B2* | 10/2020 | Caulfield | H04L 65/762 |
| 10,902,474 | B2* | 1/2021 | Lo | H04N 21/4524 |
| 2002/0121273 | A1* | 9/2002 | Nyilas | A41D 13/1245 128/99.1 |
| 2004/0088737 | A1* | 5/2004 | Donlan | H04N 21/23113 725/135 |
| 2007/0294710 | A1* | 12/2007 | Meesseman | H04L 41/22 719/328 |
| 2007/0294734 | A1* | 12/2007 | Arsenault | H04N 21/4314 725/87 |
| 2008/0114880 | A1* | 5/2008 | Jogand-Coulomb | H04L 63/10 709/227 |
| 2008/0194276 | A1* | 8/2008 | Lin | H04L 61/5014 455/466 |
| 2008/0270462 | A1* | 10/2008 | Thomsen | G06F 16/2471 |
| 2009/0133090 | A1* | 5/2009 | Busse | H04N 21/4755 725/132 |
| 2010/0021512 | A1* | 1/2010 | Arron | A61L 15/46 424/404 |
| 2010/0138297 | A1* | 6/2010 | Fitzgerald | G06Q 30/0255 715/764 |
| 2010/0138298 | A1* | 6/2010 | Fitzgerald | H04L 63/10 705/14.58 |
| 2010/0299264 | A1* | 11/2010 | Berger | G06Q 30/0601 705/59 |
| 2013/0175333 | A1* | 7/2013 | Gilbert | H04N 21/41407 235/375 |
| 2014/0373041 | A1* | 12/2014 | Yan | H04N 21/4627 725/27 |
| 2017/0347079 | A1* | 11/2017 | Wang | H04N 9/3188 |
| 2020/0084486 | A1* | 3/2020 | Cho | H04N 21/8456 |

FOREIGN PATENT DOCUMENTS

| | | |
|---|---|---|
| JP | 2006-084401 A | 3/2006 |
| JP | 2007-315808 A | 12/2007 |
| JP | 2009-105495 A | 5/2009 |
| JP | 2009-141684 A | 6/2009 |
| JP | 2011-247583 A | 12/2011 |
| JP | 2016-052112 A | 4/2016 |
| JP | 2020-005053 A | 1/2020 |
| WO | 2018/016010 A1 | 1/2018 |
| WO | WO-2020003673 A1 | 1/2020 |

* cited by examiner

SPECTRAL SENSITIVITY MEASURING DEVICE AND SPECTRAL SENSITIVITY MEASURING METHOD

CROSS REFERENCE TO RELATED APPLICATIONS

This application is a U.S. National Phase of International Patent Application No. PCT/JP2022/005124 filed on Feb. 9, 2022, which claims priority benefit of Japanese Patent Application No. JP 2021-144243 filed in the Japan Patent Office on Sep. 3, 2021. Each of the above-referenced applications is hereby incorporated herein by reference in its entirety.

TECHNICAL FIELD

The present technology relates to a spectral sensitivity measuring device and a spectral sensitivity measuring method, and particularly, relates to a spectral sensitivity measuring device and a spectral sensitivity measuring method for measuring the spectral sensitivity of an imaging device.

BACKGROUND ART

In recent years, the demand for an imaging device including a solid-state imaging element (image sensor), which is a central component of a digital camera, is increasing more and more. For example, it has been considered that an imaging device including a complementary metal oxide semiconductor (CMOS) image sensor is used as a spectrometer.

In a case where an imaging device including an image sensor is used as a spectrometer, it is necessary to measure the spectral sensitivity of the imaging device. Conventionally, as a method for measuring the spectral sensitivity of an imaging device, a method of irradiating the imaging device including an image sensor with a light of a light source having a single wavelength is common. However, in such a spectral sensitivity measuring method, since the imaging device including the image sensor is irradiated with a light while changing the single wavelength, there is a problem that a long time is required to measure the spectral sensitivity. As a method for solving such a problem, there is a known spectral sensitivity measuring method in which a chart group including a plurality of local regions (charts) that is two-dimensionally disposed, is collectively imaged by an imaging device including an image sensor, so as to measure the spectral sensitivity of the imaging device (for example, see Patent Document 1).

CITATION LIST

Patent Document

Patent Document 1: Japanese Patent Application Laid-Open No. 2020-5053

SUMMARY OF THE INVENTION

Problems to be Solved by the Invention

However, in the method of Patent Document 1, there is room for improvement in accurately measuring the spectral sensitivity of the imaging device.

Hence, a main object of the present technology is to provide a spectral sensitivity measuring device capable of measuring the spectral sensitivity of an imaging device accurately as well as in a short time.

Solutions to Problems

The present technology provides a spectral sensitivity measuring device for an imaging device, the spectral sensitivity measuring device including:
  a chart generation system that generates a chart including at least one chart portion having at least one color region at a position opposed to the imaging device; and
  a processing system that calculates a spectral sensitivity of the imaging device on the basis of a captured image, by the imaging device, of the chart generated at the position opposed to the imaging device.

The chart generation system may sequentially generate a plurality of the charts at a position opposed to the imaging device respectively.

The chart generation system may have: a light source; and an optical filter group including a plurality of optical filters that is selectively disposed between the light source and the imaging device.

The chart generation system may further include a moving mechanism that moves the optical filter group and a system including the imaging device and the light source relatively such that the plurality of optical filters is sequentially positioned between the imaging device and the light source respectively.

The moving mechanism may move the plurality of optical filters in a direction substantially orthogonal to an arrangement direction of the imaging device and the light source.

The moving mechanism may have: a rotating member that has the plurality of optical filters disposed along a circumferential direction, and that is rotatable around an axis substantially parallel to an arrangement direction of the imaging device and the light source; and a driving unit that rotates the rotating member around the axis.

The chart generation system may include a diffusion plate disposed between the imaging device and each of the plurality of optical filters.

The chart generation system may include a variable wavelength light source having a variable light emission wavelength.

The chart generation system may have an optical filter group including a plurality of optical filters that is selectively disposed between the imaging device and the variable wavelength light source.

The chart generation system may further include a moving mechanism that moves the optical filter group and a system including the imaging device and the variable wavelength light source such that the plurality of optical filters is sequentially positioned between the imaging device and the variable wavelength light source respectively.

The moving mechanism may include a moving mechanism that moves the plurality of optical filters in a direction substantially orthogonal to an arrangement direction of the imaging device and the variable wavelength light source.

The variable wavelength light source may be opposed to the imaging device.

The chart generation system may include an optical waveguide member having an incident end connected to the variable wavelength light source and an emission end opposed to the imaging device.

The chart generation system may include a plurality of optical waveguide members corresponding to a plurality of the imaging devices, and each of the plurality of optical waveguide members may have an incident end connected to the variable wavelength light source and an emission end opposed to the imaging device corresponding thereto.

The chart generation system may include: a light source group including a plurality of light sources having different light emission wavelengths; and a moving mechanism that moves the light source group and the imaging device relatively such that the plurality of light sources and the imaging device are sequentially opposed to each other respectively.

The chart generation system may include: a light source group including a plurality of light sources having different light emission wavelengths; and a moving mechanism that moves the light source group and an imaging device group including a plurality of the imaging devices relatively such that the plurality of light sources and the plurality of imaging devices are sequentially opposed to each other respectively.

The spectral sensitivity measuring device may further include a control unit that controls an imaging time during which the imaging device images the chart, and/or a time during which the imaging device and the chart are opposed to each other in accordance with a luminance of the color region.

The spectral sensitivity measuring device may further include a control unit that controls an imaging time during which the imaging device images the chart, and/or a time during which the imaging device and the chart are opposed to each other in accordance with a luminance of the color region.

The processing system may calculate a theoretical value yth of a pixel value of the captured image from Formula (1) described below, calculate a correction coefficient C from Formula (2) described below, and calculate a spectral sensitivity x from Formula (3) described below using a corrected pixel value yc obtained by multiplying an actual measurement value of a pixel value of a captured image, of the chart, different from the captured image by the imaging device, by the correction coefficient C:

$$y_{th} = A x_a \quad (1)$$

(where $x_a$ is a spectral sensitivity of an imaging device with a known spectral sensitivity, and A is a spectral characteristic of a chart);

$$C = y_{th}/y_a \quad (2)$$

(where $y_a$ is a pixel value of a captured image by an imaging device with a known spectral sensitivity); and $$y_c = A x \quad (3)$$

(where A is a spectral characteristic of a chart).

The spectral sensitivity measuring device according to claim 18, in which the spectral sensitivity is x calculated in Formula (4) described below and Formula (5) described below, and the processing system can set a value of λ in Formula (4) described below in accordance with a wavelength to be calculated when calculating the spectral sensitivity in Formula (4) described below and Formula (5) described below:

$$x = \mathrm{argmin}_x \{\|Ax - s(b)\|_2^2 + \lambda \|Fx\|_2^2\} \quad (4)$$

$$s(b) = Cb \quad (5)$$

(where λ is a regularization parameter, F is a differential matrix formed by a first-degree differential equation, A is a spectral characteristic of a chart, and b is a pixel value of a captured image).

The spectral sensitivity may be x calculated in Formula (6) described below, and the processing system may set a value of λ in Formula (6) described below in accordance with a wavelength to be calculated when calculating the spectral sensitivity in Formula (6) described below:

$$x = \mathrm{argmin}_x \{\|Ax - s(b)\|_2^2 + \lambda \|Fx\|_2^2\} \quad (6)$$

(where λ is a regularization parameter, F is a differential matrix formed by a first-degree differential equation, A is a spectral characteristic of a chart, b is a pixel value of a captured image, and s is a pixel value after the correction of light quantity).

The processing system may set a value of λ in Formula (6) described above in accordance with a magnitude relation between a wavelength to be calculated and at least one threshold value Th.

The processing system may calculate the spectral sensitivity using λ1 as λ in Formula (6) described above in a case where a wavelength to be calculated is less than the threshold value Th, and calculate the spectral sensitivity using λ2 different from the abovementioned λ1 as λ in Formula (6) described above in a case where a wavelength to be calculated is equal to or more than the threshold value Th.

The at least one threshold value may include a plurality of threshold values, the processing system may calculate the spectral sensitivity using λ1 as λ in Formula (6) described above in a case where a wavelength to be calculated is less than a minimum threshold value $Th_{min}$ among the plurality of threshold values Th, calculate the spectral sensitivity using λ2 different from the abovementioned λ1 as λ in Formula (6) described above in a case where a wavelength to be calculated is equal to or more than a maximum threshold value $Th_{max}$ among the plurality of threshold values Th, and calculate the spectral sensitivity using λ3 different from the abovementioned λ1 as λ in Formula (6) described above in a case where a wavelength to be calculated is equal to or more than the minimum threshold value $Th_{min}$ and less than the maximum threshold value $Th_{max}$.

The processing system may include a pixel value acquisition unit that acquires a pixel value of the captured image, and a spectral sensitivity calculation unit that calculates the spectral sensitivity on the basis of a spectral characteristic of the chart and the pixel value acquired by the pixel value acquisition unit.

The at least one color region may include a plurality of color regions.

The chart generation system may include a light emitting element array opposed to the imaging device.

The present technology also provides a spectral sensitivity measuring method including:
  a step of generating a chart including at least one chart portion having at least one color region at a position opposed to an imaging device;
  a step of imaging the chart generated at the position opposed to the imaging device by the imaging device;
  a step of acquiring a pixel value of the captured image of the chart imaged in the imaging step; and
  a step of calculating a spectral sensitivity of the imaging device on the basis of a spectral characteristic of the chart and the pixel value acquired in the acquiring step.

In the generating step, a plurality of the charts may sequentially be generated at a position opposed to the imaging device respectively.

MODE FOR CARRYING OUT THE INVENTION

Hereinafter, preferred embodiments of the present technology will be explained in detail with reference to the accompanying drawings. Note that, in the present specification and the drawings, components having substantially the same functional configurations are denoted using the same reference signs so that redundant explanations are omitted. The embodiments explained below illustrate representative embodiments of the present technology, and the scope of the present technology is not narrowly interpreted according to these embodiments. In the present specification, even in a case where it is indicated that the spectral sensitivity measuring device and the spectral sensitivity measuring method according to the present technology exhibit a plurality of effects, the spectral sensitivity measuring device and the spectral sensitivity measuring method according to the present technology are only required to exhibit at least one effect. The effects described in the present specification are merely examples and are not limited, and other effects may be provided.

Furthermore, the description will be given in the following order.

1. Introduction
  2. Spectral sensitivity measuring device according to the first embodiment of the present technology
  3. Spectral sensitivity measuring device according to a modification of the first embodiment of the present technology
  4. Spectral sensitivity measuring device according to Example 1 of the second embodiment of the present technology
  5. Spectral sensitivity measuring device according to Example 2 of the second embodiment of the present technology
  6. Spectral sensitivity measuring device according to Example 1 of the third embodiment of the present technology
  7. Spectral sensitivity measuring device according to Example 2 of the third embodiment of the present technology
  8. Spectral sensitivity measuring device according to Example 1 of the fourth embodiment of the present technology
  9. Spectral sensitivity measuring device according to Example 2 of the fourth embodiment of the present technology
  10. Spectral sensitivity measuring device according to the fifth embodiment of the present technology
  11. Spectral sensitivity measuring device according to the sixth embodiment of the present technology
  12. Spectral sensitivity measuring device according to the seventh embodiment of the present technology
  13. Spectral sensitivity measuring device according to the eighth embodiment of the present technology
  14. Modification of the present technology <1. Introduction>

Conventionally, a device (spectral sensitivity measuring device) that measures the spectral sensitivity of an imaging device including an image sensor on the basis of a captured image of a subject by the imaging device is known. Examples of the subject include natural objects, artificial objects, charts for reproducing colors, or the like.

Figure 23:
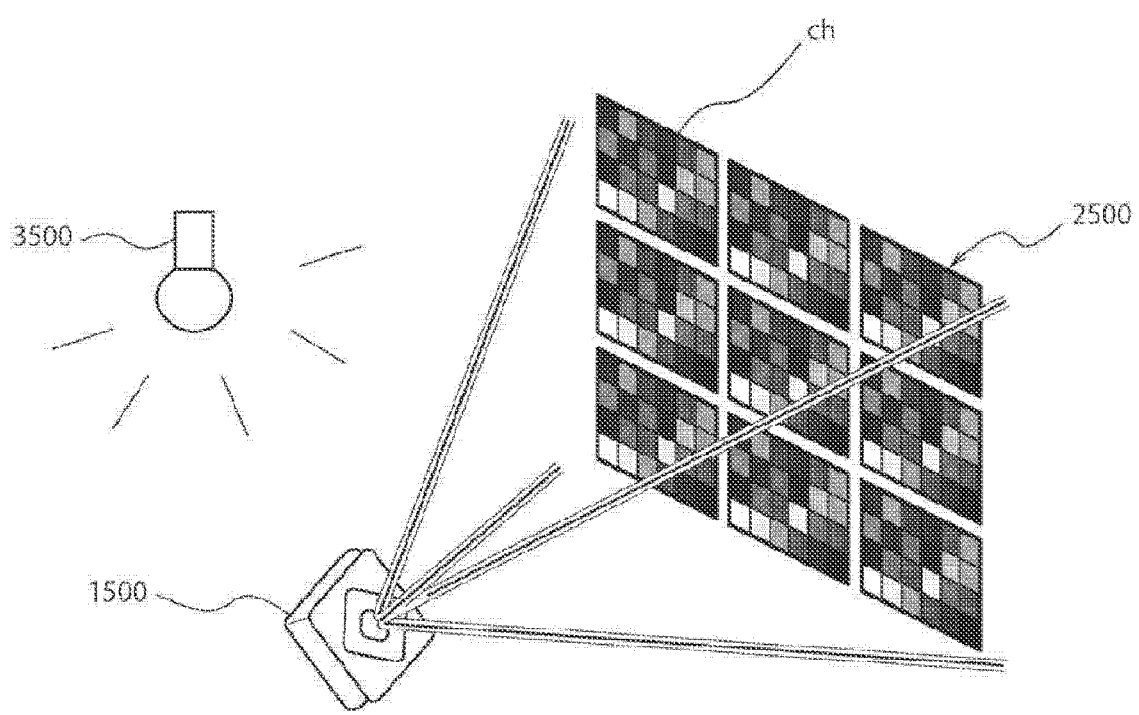

For example, in the spectral sensitivity measuring device of the comparative example illustrated in FIG. 23, an entire chart group 2500 irradiated with light from a light source 3500 is collectively imaged by an imaging device 1500 including an image sensor, and the spectral sensitivity of the imaging device 1500 is calculated on the basis of the captured image. The chart group 2500 is configured by two-dimensionally disposing a plurality of charts ch (for example, Macbeth chart) each having a color region.

Figure 24:
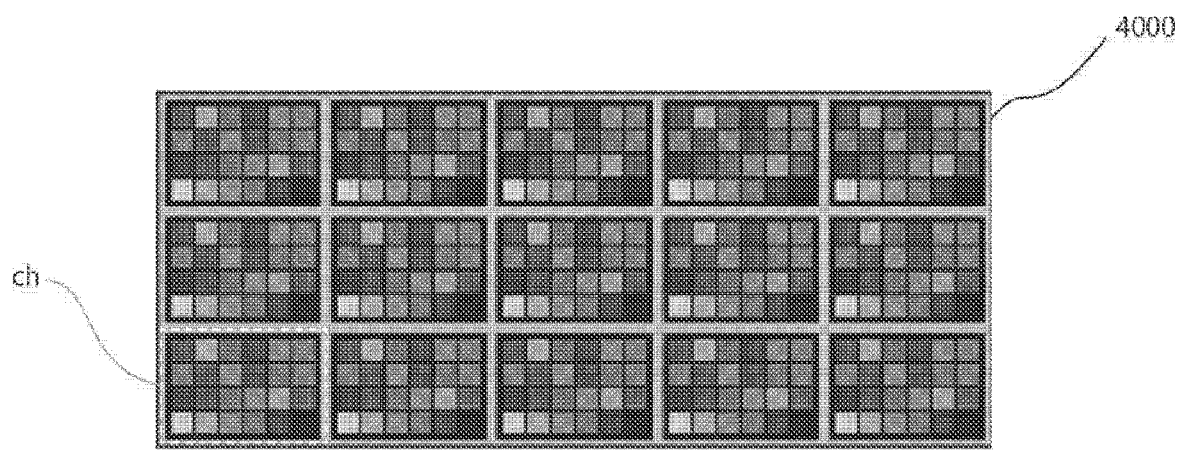

FIG. 24 is a front view of a chart group 4000 having a larger number of charts and a larger number of color regions for each chart than the chart group 2500.

When the number of charts and the number of color regions for each chart are large as in the chart group 4000, a chart group becomes large as a whole. In a case where the spectral sensitivity of an imaging device including an image sensor is measured by using the chart group 4000 in the spectral sensitivity measuring device of the comparative example, an overlapped region (overlapping region) between adjacent charts occurs within the imaging view angle of the imaging device. Therefore, in a case of measuring the spectral sensitivity at a measurement point inside the overlapping region, it is necessary to take measures such as moving a chart group or the imaging device.

Figure 25:
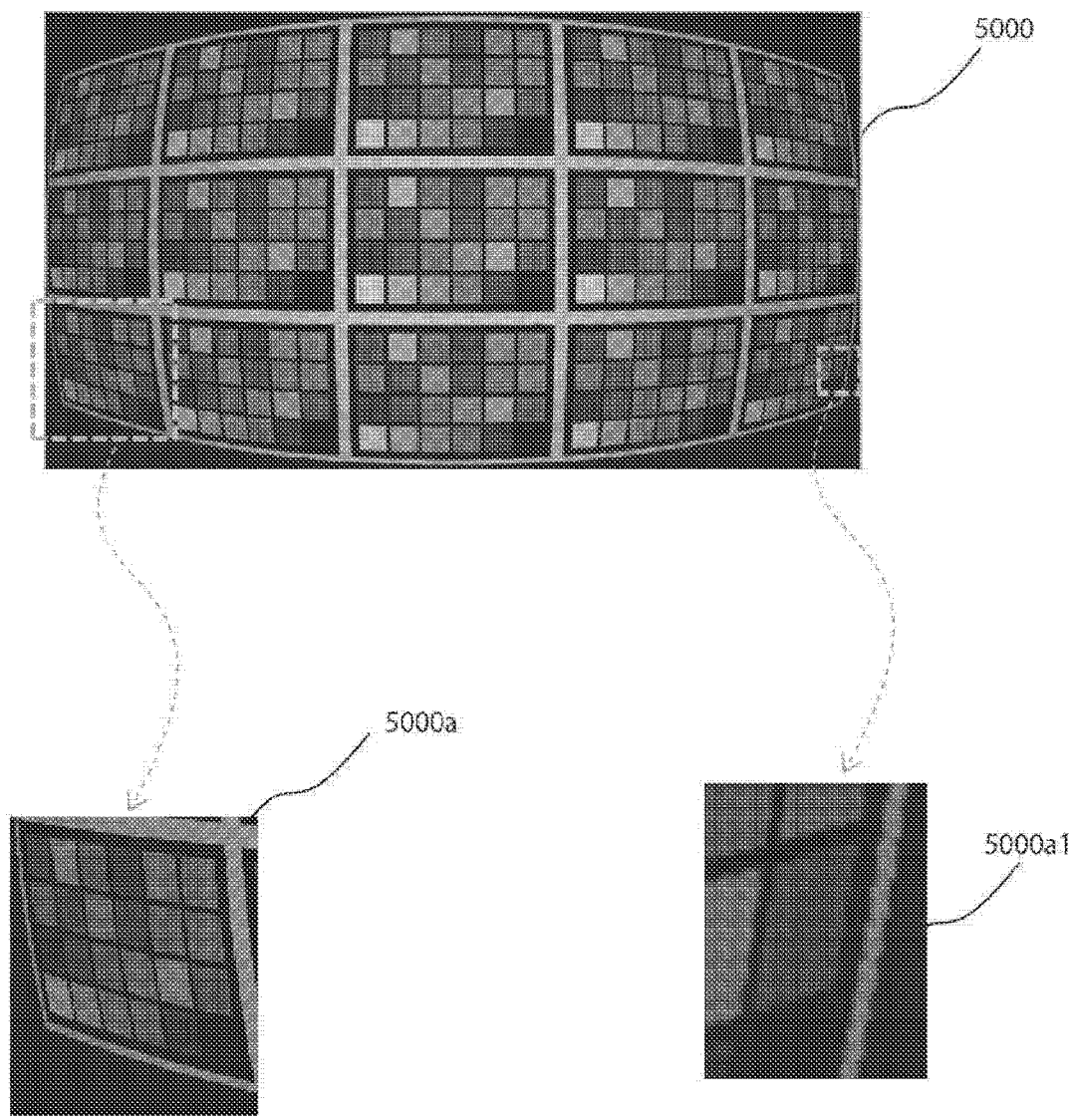

FIG. 25 is a view illustrating a captured image 5000 by an image sensor of the chart group 4000.

In a case where the spectral sensitivity of an imaging device including an image sensor and a lens (that may be an on-chip lens) is measured using the chart group 4000 in the spectral sensitivity measuring device of the comparative example, a corner portion 5000a of the captured image 5000 (corresponding to a corner portion of the chart group 4000) is deformed due to the distortion of the lens, and particularly, a corner portion 5000a1 of the corner portion 5000a is greatly deformed (see FIGS. 24 and 25).

Accordingly, in the spectral sensitivity measuring device of the comparative example, it is difficult to acquire a pixel value unless a chart positioned at the corner of the chart group is formed into the shape corresponding to the distortion or an imaging method corresponding to the distortion is used for imaging (see FIG. 25).

In any case, in the spectral sensitivity measuring device of the comparative example, there has been room for improvement in accurately measuring the spectral sensitivity of an imaging device including an image sensor.

Hence, the inventors have developed a spectral sensitivity measuring device and a spectral sensitivity measuring method according to the present technology as a spectral sensitivity measuring device and a spectral sensitivity measuring method capable of accurately measuring the spectral sensitivity of an imaging device including an image sensor.

Hereinafter, the spectral sensitivity measuring device according to the present technology will be explained while taking several embodiments as examples.

<2. Spectral Sensitivity Measuring Device According to the First Embodiment of the Present Technology>

Hereinafter, a spectral sensitivity measuring device 10 according to the first embodiment of the present technology will be explained with reference to the drawings.

Figure 1:
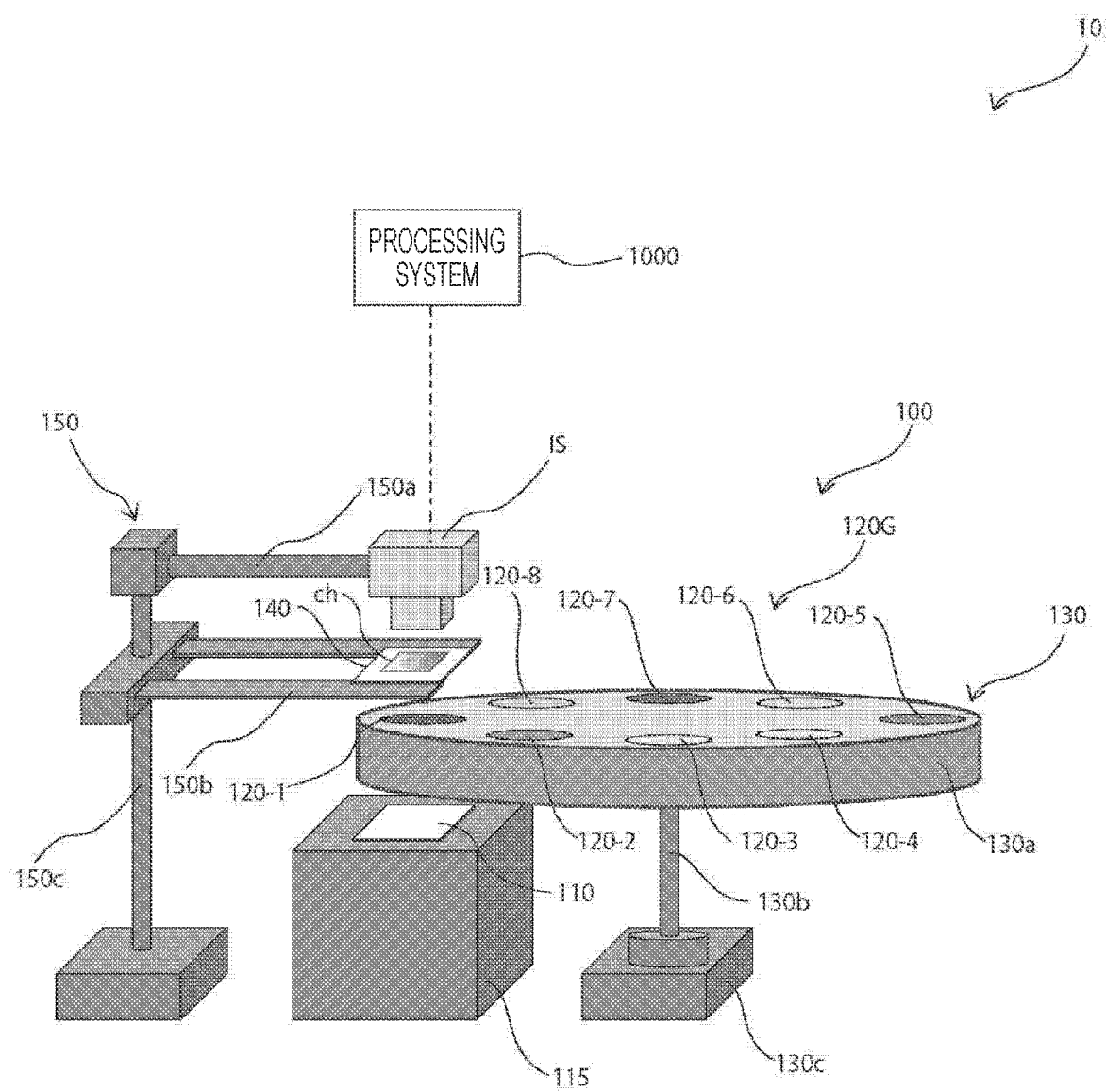
FIG. 1 is a diagram schematically illustrating a configuration of a spectral sensitivity measuring device according to a first embodiment of the present technology.

FIG. 1 is a diagram (perspective view) schematically illustrating a configuration of the spectral sensitivity measuring device 10 according to the first embodiment of the present technology.

The spectral sensitivity measuring device 10 according to the first embodiment is a device that is used as, for example, a spectrometer and that measures the spectral sensitivity of an imaging device IS including an image sensor and a lens. That is, a measurement target of the spectral sensitivity measuring device 10 is the spectral sensitivity of the imaging device IS including an image sensor and a lens.

Here, the imaging device IS including an image sensor as a spectrometer can be used, for example, in order to recognize a specific crop in an agricultural field.

Furthermore, the imaging device IS including an image sensor as a spectrometer can also be used to remove unnecessary objects by performing 3D segmentation with high accuracy using wavelength information acquired by the imaging device IS or to investigate the geology and rigidity of the soil before mining, for example, in a smart contraction field.

Furthermore, the imaging device IS including an image sensor as a spectrometer can also be used, for example, in order to observe the food accuracy in a retail field.

In addition, the imaging device IS including an image sensor as a spectrometer is also expected to be used in, for example, medical and beauty fields.

Examples of the image sensor of the imaging device IS include a CCD image sensor, a CMOS image sensor, and the like.

As one example, the image sensor of the imaging device IS includes a plurality of pixels arranged two-dimensionally, photoelectrically converts a light received for each pixel, and outputs an electric signal corresponding to the light quantity of the light. Each pixel has, for example, a light receiving element such as a photodiode. A signal value of the electrical signal is also referred to as a pixel value.

Figure 2:
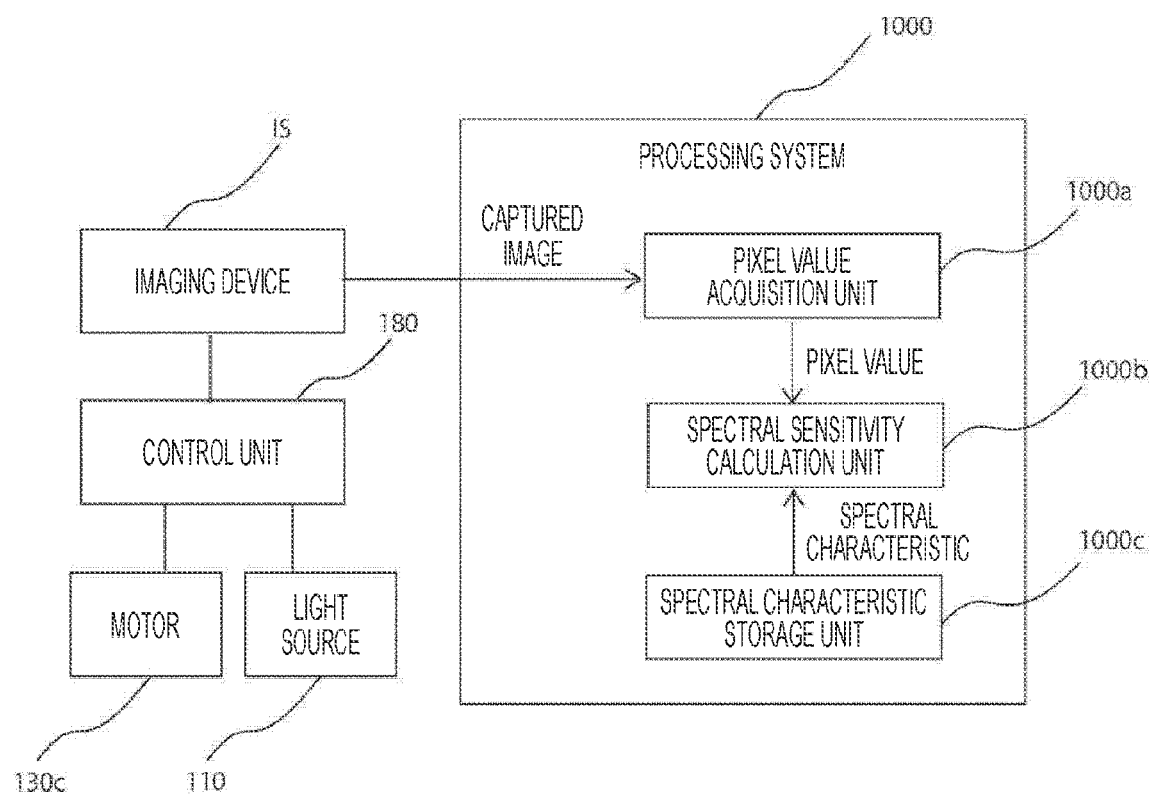
FIG. 2 is a block diagram illustrating functions of a processing system in the spectral sensitivity measuring device in FIG. 1.

The image sensor of the imaging device IS is controlled by, for example, a control unit 180 (see FIG. 2).

As one example, the image sensor of the imaging device IS receives light from a subject (for example, a chart) for each pixel via a lens.

<<Configuration of Spectral Sensitivity Measuring Device>>

Hereinafter, a configuration of the spectral sensitivity measuring device 10 according to the first embodiment will be explained with reference to FIG. 1 and FIG. 2.

As one example, as illustrated in FIG. 1, the spectral sensitivity measuring device 10 includes a chart generation system 100 and a processing system 1000.

(Chart Generation System)

The chart generation system 100 generates a chart ch including at least one chart portion (for example, Macbeth chart) having at least one color region (for example, a plurality of color regions) at a position opposed to (specifically, directly opposed to) the imaging device IS including an image sensor.

Here, the chart ch is an object to be imaged by the imaging device IS. In the present technology, three modes are assumed as modes in which the chart ch is generated. The first one is a case where the chart ch is generated by using a transmission type chart plate (for example, an optical filter, a transmission type liquid crystal panel, or the like) and a backlight light source. The second one is a case where the chart ch is generated by a light of a light source. The third one is a case where the chart ch is generated by using a reflection type chart plate (for example, a reflection type liquid crystal panel, or the like) and a light source.

As one example, the chart generation system 100 sequentially generates a plurality of (for example, eight) charts ch at a position opposed to the imaging device IS respectively.

Here, the combination and arrangement of colors of the plurality of color regions in each of the plurality of charts ch are the same. However, the combination and/or arrangement of colors may be different between at least two charts ch.

As one example, the chart generation system 100 includes a light source 110 and generates a chart ch between the imaging device IS and the light source 110.

As one example, the chart generation system 100 has, in addition to the light source 110, an optical filter group 120G including a plurality of (for example, eight) optical filters 120 (for example, first to eighth optical filters 120-1 to 120-8) which is selectively disposed between the light source 110 and the imaging device IS. The chart generation system 100 further has a control unit 180. Note that the control unit 180 may be included in the processing system 1000.

As one example, the light source 110 and the imaging device IS are disposed vertically. Here, for example, the light source 110 is disposed immediately below the imaging device IS. The emission direction of the light source 110 is, for example, upward. The light source 110 is installed on a support member 115. Note that the light source 110 and the support member 115 may be configured as a single object.

As one example, the imaging device IS is supported by a support structure body 150. As one example, the support structure body 150 has a support column 150c and first and second arms 150a and 150b each supported by the support column 150c in a cantilevered state. The first and second arms 150a and 150b are arranged vertically (note that the first arm 150a is above the second arm 150b). The imaging device IS is held at a tip end portion of the first arm 150a in an attachable/detachable manner. The imaging device IS is held by the first arm 150a such that, for example, an imaging surface faces downward.

The light source 110 is controlled by the control unit 180 (see FIG. 2).

As the light source 110, for example, a light emitting diode (LED), an organic light emitting diode (OLED), a laser, a halogen lamp, a xenon lamp, a fluorescent lamp, or the like can be used.

As one example, each optical filter 120 is a monochromatic filter, and transmits a light, among lights from the light source 110, having a corresponding wavelength region. Note that each optical filter 120 may include a plurality of transmission portions corresponding to a plurality of color regions that is arranged one-dimensionally or two-dimensionally. In this case, each transmission portion transmits a light, among lights from the light source 110, having a wavelength region of a corresponding color region.

As one example, the chart generation system 100 further includes a moving mechanism 130 that moves the optical filter group 120G and a system including the imaging device IS and the light source 110 relatively such that the plurality of optical filters 120 is sequentially positioned between the imaging device IS and the light source 110 respectively.

As one example, the moving mechanism 130 moves the plurality of optical filters 120 in a direction (for example, the horizontal direction) substantially orthogonal to the arrangement direction (for example, the vertical direction) of the imaging device IS and the light source 110.

As one example, the moving mechanism 130 includes a turret 130a as a rotating member in which a plurality of (for example, eight) optical filters 120 is disposed along the circumferential direction, and a motor 130c as a driving unit which rotates the turret 130a. The motor 130c is controlled by the control unit 180 (see FIG. 2), for example.

The turret 130a includes, for example, a substantially-disk-shaped member, and a plurality of (for example, eight) through holes is formed at substantially equal intervals along the circumferential direction in the outer peripheral portion thereof. The optical filter 120 is disposed in each through hole.

As one example, the turret 130a is rotatable about an axis substantially parallel to the arrangement direction (for example, the vertical direction) of the imaging device IS and the light source 110. The motor 130c rotates the turret 130a about the axis.

More specifically, a rotating shaft 130b that rotates in conjunction with the rotation of the rotor (mover) of the motor 130c is attached to a central portion of the turret 130a. As one example, the rotating shaft 130b extends in the vertical direction, and the turret 130a is maintained in a substantially horizontal state.

As one example, the chart generation system 100 includes a diffusion plate 140 disposed between the imaging device IS and each of the plurality of optical filters 120. As one example, the diffusion plate 140 is a transmission type diffusion plate, and is held at a tip end portion of the second arm 150b of the support structure body 150. Since a light that is emitted from the light source 110 and transmits through the optical filter 120 can be diffused by the diffusion plate 140, the optical filter 120 can be downsized.

In the chart generation system 100 configured as described above, each of the plurality of optical filters 120 can be sequentially positioned between the imaging device IS and the light source 110 by rotating the turret 130a. By turning on the light source 110 when each optical filter 120 is positioned between the imaging device IS and the light source 110, the optical filter 120 can be irradiated with a light from the light source 110, and the chart ch corresponding to the optical filter 120 can be generated at a position opposed to the imaging device IS (for example, a position of the diffusion plate 140). Note that, by moving the plurality of optical filters 120 while the light source 110 is turned on, each optical filter 120 may be sequentially irradiated with a light from the light source 110.

Accordingly, the chart generation system 100 can sequentially generate the plurality of charts ch at a position opposed to the imaging device IS respectively.

Then, it is possible to image each chart ch sequentially generated at the position opposed to the imaging device IS by the imaging device IS.

(Processing System)

The processing system 1000 calculates the spectral sensitivity of the imaging device IS on the basis of the captured image, of the chart ch generated at the position opposed to the imaging device IS, by the imaging device IS.

FIG. 2 is a block diagram illustrating functions of the processing system 1000. The processing system 1000 includes a pixel value acquisition unit 1000a that acquires the pixel value of the captured image of the chart ch by the imaging device IS, and a spectral sensitivity calculation unit 1000b that calculates the spectral sensitivity of the imaging device IS on the basis of the spectral characteristic of the chart ch and the pixel value acquired by the pixel value acquisition unit 1000a.

The processing system 1000 further includes a spectral characteristic storage unit 1000c that stores therein the spectral characteristic of the chart ch.

The processing system 1000 is implemented by hardware including, for example, a CPU, a chip set, or the like.

<<Operation of Spectral Sensitivity Measuring Device>>

The operation of the spectral sensitivity measuring device 10 according to the first embodiment (one example of the spectral sensitivity measuring method according to the present technology) will be explained with reference to a flowchart in FIG. 3.

The imaging device IS as a measurement target is attached, in advance, to a tip end portion of the first arm 150a of the support structure body 150 and is located immediately above the light source 110 (see FIG. 1).

In the first step S1, the control unit 180 sets 1 to n.

In the following step S2, the control unit 180 generates the n-th chart. Specifically, the control unit 180 controls the motor 130c to position the n-th optical filter 120-n between the imaging device IS and the light source 110, and turns on the light source 110. Therefore, the n-th chart is generated at a position opposed to the imaging device IS. Note that, by moving the optical filter 120-n while the light source 110 is turned on, the optical filter 120-n may be irradiated with a light from the light source 110.

Note that the control unit 180 may stop the turret 130a when the n-th optical filter 120-n is positioned between the imaging device IS and the light source 110, but may continue to rotate the turret 130a at a low speed.

In the following step S3, the imaging device IS images the n-th chart. Specifically, the control unit 180 transmits an imaging trigger signal to the imaging device IS when step S2 is executed. When receiving the imaging trigger signal, the imaging device IS images the n-th chart, and outputs data of the captured image (a signal which has been photoelectrically converted for each pixel) to the pixel value acquisition unit 1000a.

In the following step S4, the pixel value acquisition unit 1000a acquires a pixel value (signal value and luminance value of each pixel) of the captured image of the n-th chart.

In the following step S5, the control unit 180 determines whether or not n<N (for example, 8) or less is satisfied. When the determination in step S5 is positive, the process proceeds to step S6, whereas when the determination is negative, the process proceeds to step S7.

In step S6, the control unit 180 increments n. Once step S6 is executed, the process returns to step S2. Therefore, a series of processing in steps S2 to S5 is executed again.

In step S7, the spectral sensitivity calculation unit 1000b calculates the spectral sensitivity of the imaging device IS.

Specifically, the spectral sensitivity calculation unit 1000b measures a spectral sensitivity x of the imaging device IS when the chart ch is imaged, on the basis of an acquired pixel value b of each chart ch and a spectral characteristic A of the chart ch, by using Formula (F1) described below.

[Math. 1]

$$b = Ax \qquad (F1)$$

Here, since the pixel value b is an actual measurement value, it is also referred to as an observed pixel value. The spectral characteristic A is a known value that can be calculated from the spectral intensity of the light source 110 and the spectral transmittance of each optical filter 120. The spectral characteristic A is stored in the spectral characteristic storage unit 1000c for each optical filter 120.

In a case where the number of equations is sufficient, the spectral sensitivity x can be obtained by a least-squares method. However, in a case where the number of equations is smaller than an unknown quantity, there is no solution, or there is a plurality of solutions, which results in a defective setting problem. In this case, although the spectral sensitivity x cannot be solved by the least-squares method, the spectral sensitivity x can be obtained through, for example, the Tikhonov regularization, the Wiener estimation, the quadratic programming, or the like.

Generally, the larger the number of equations is, the more stable the solution becomes. Therefore, it is desirable to increase the number of equations. Here, the number of equations can be increased by increasing the number of color regions of a chart portion in each chart to be imaged.

In addition, for example, in a case where a representative value or the dispersion of the spectral sensitivity x is known, an approximate solution of the spectral sensitivity x can be obtained through a non-parametric estimation method that does not depend on the distribution as in Formula (F2) described below.

[Math. 2]

$$x = \mathrm{argmin}_x \left\{ \|Ax - (b)\|_2^2 + \lambda \|x_0 - x\|_{\Sigma^{-1}}^2 \right\} \qquad (F2)$$

Note that $x_0$ is a representative value of the spectral sensitivity, and $\Sigma^{-1}$ is a covariance matrix of the spectral sensitivity.

Figure 3:
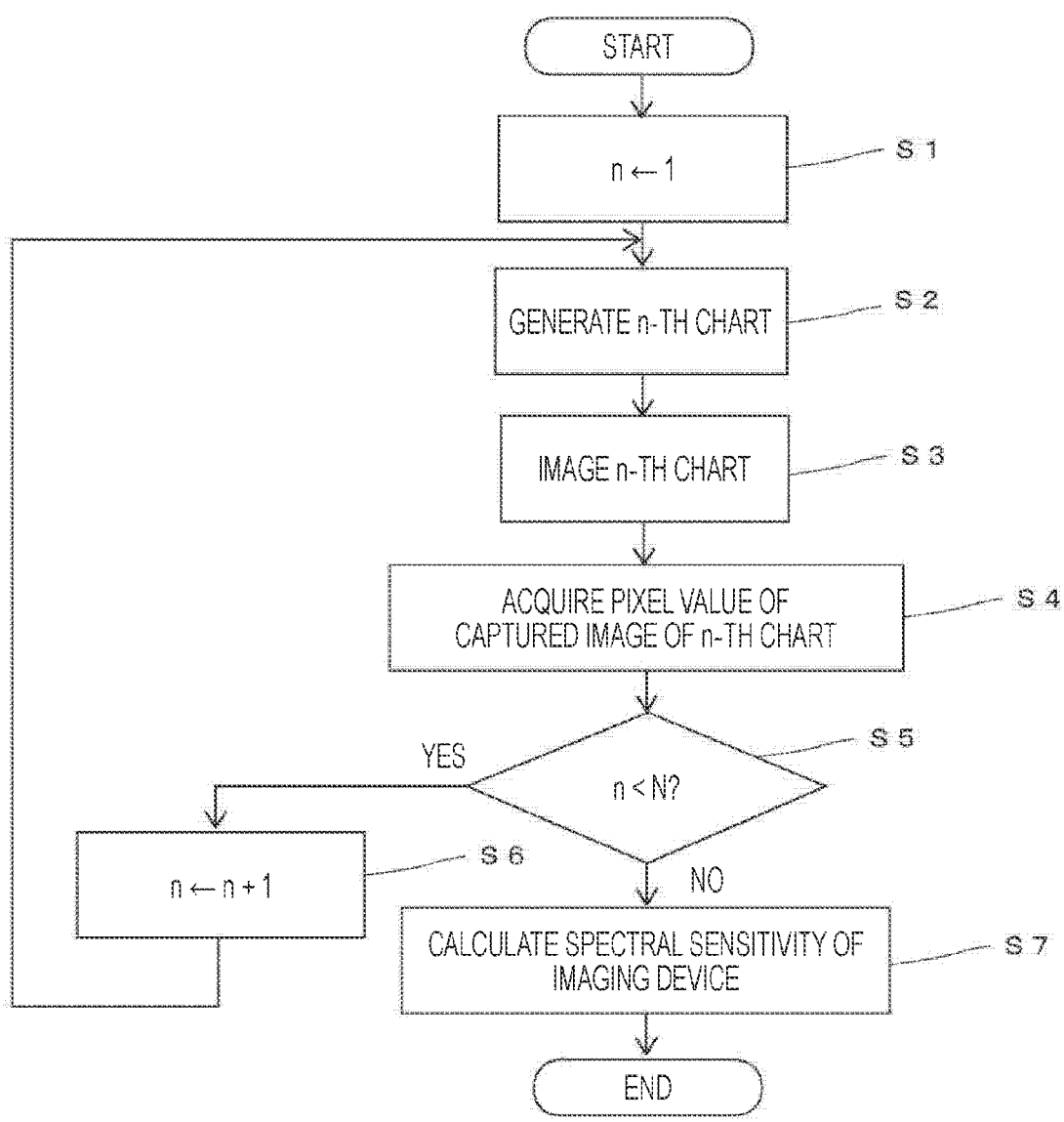
FIG. 3 is a flowchart for explaining an operation of the spectral sensitivity measuring device in FIG. 1.

As described above, after the spectral sensitivity of one imaging device IS is measured, the spectral sensitivity of another imaging device IS can be measured according to the flow illustrated in FIG. 3. That is, it is possible to replace the imaging device IS to be measured for the measurement.

<<Effects of Spectral Sensitivity Measuring Device>>

Hereinafter, effects of the spectral sensitivity measuring device 10 according to the first embodiment and the spectral sensitivity measuring method using the spectral sensitivity measuring device 10 will be explained.

The spectral sensitivity measuring device 10 according to the first embodiment includes the chart generation system 100 that generates a chart ch including at least one chart portion having at least one color region at a position opposed to the imaging device IS, and the processing system 1000 that calculates the spectral sensitivity of the imaging device IS on the basis of a captured image, by the imaging device IS, of the chart ch generated at the position opposed to the imaging device IS.

According to the spectral sensitivity measuring device 10, it is possible to provide a spectral sensitivity measuring device capable of accurately measuring the spectral sensitivity of the imaging device IS.

Therefore, in a case where the imaging device IS is used as a spectrometer, for example, it is possible to accurately distinguish whether or not the imaging device IS is a quality product.

Furthermore, the spectral sensitivity measuring device 10 is particularly effective in that, similar to the imaging device IS, an image sensor can accurately measure the spectral sensitivity of the imaging device in which the spectral sensitivity easily changes due to the influence of the incident angle characteristic of a lens.

Figure 4A:
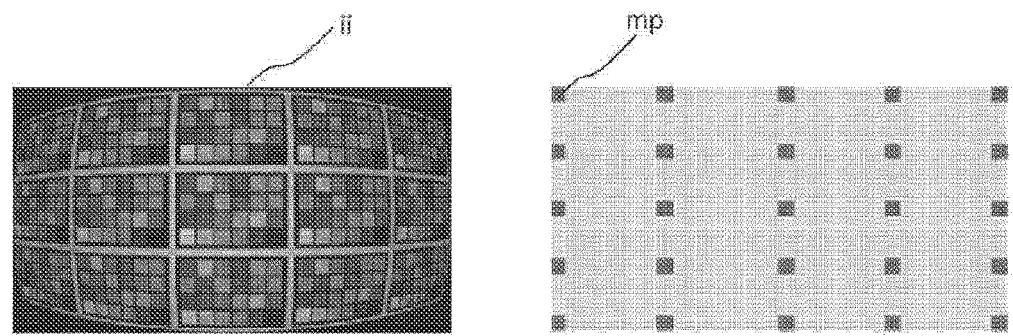
FIGS. 4A and 4B are diagrams for explaining an advantage 1 of the spectral sensitivity measuring device in FIG. 1.

Meanwhile, in the spectral sensitivity measuring device of the comparative example illustrated in FIG. 23, as illustrated in a left diagram of FIG. 4A, a part of a chart group is missing at a corner portion of a captured image ii, of the chart group, by the imaging device due to the influence of the distortion of a lens as described above, and thus, it is impossible to place a measurement point mp at the corner portion (see a right diagram of FIG. 4A). For this reason, the spectral sensitivity cannot be measured for the corner portion.

Figure 4B:
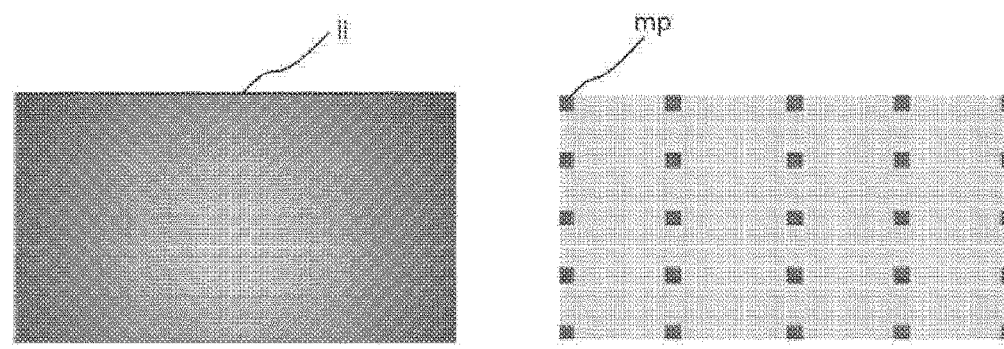

On the other hand, in the spectral sensitivity measuring device 10 according to the first embodiment, as illustrated in a left diagram of FIG. 4B, an entire surface of a chart can be imaged in a substantially uniform (substantially flat) manner, a part of the chart is not missing at a corner portion of the captured image ii due to the influence of the distortion of a lens, and thus, it is also possible to place the measurement point mp at the corner portion (see a right diagram of FIG. 4B). Therefore, according to the spectral sensitivity measuring device 10 of the first embodiment, the spectral sensitivity can also be measured for the corner portion of the captured image ii, and it is unnecessary to design a chart according to the distortion of a lens.

Figure 5A:
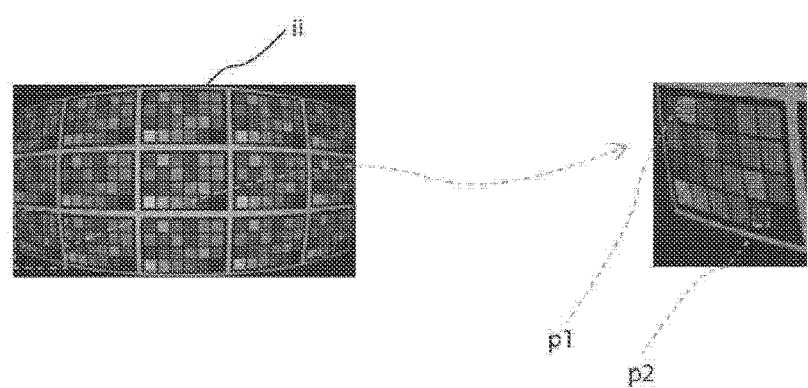
FIGS. 5A and 5B are diagrams for explaining an advantage 2 of the spectral sensitivity measuring device in FIG. 1.

In addition, in the spectral sensitivity measuring device of the comparative example illustrated in FIG. 23, as illustrated in FIG. 5A, since the positions of corresponding pixels (for example, p1, p2) are different between the captured images of the respective charts in the captured image ii of the chart group, the spectral sensitivity is calculated in a state of including noise in the spatial direction, and thus, the measurement accuracy deteriorates.

Figure 5B:
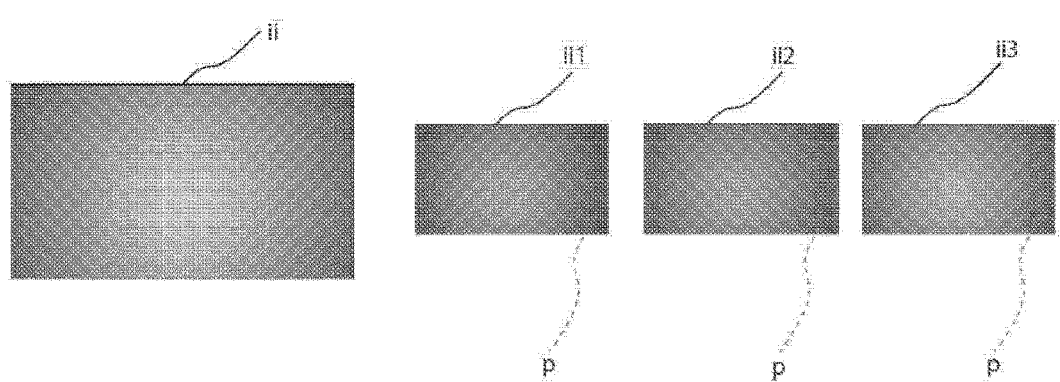
Figure 6A:
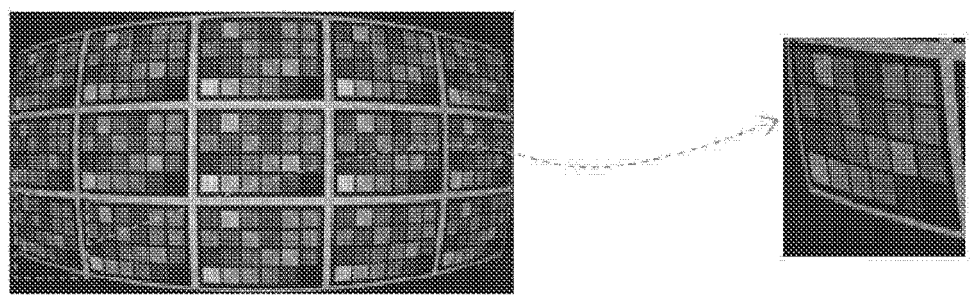
FIGS. 6A and 6B are diagrams for explaining an advantage 3 of the spectral sensitivity measuring device in FIG. 1.
Figure 6B:
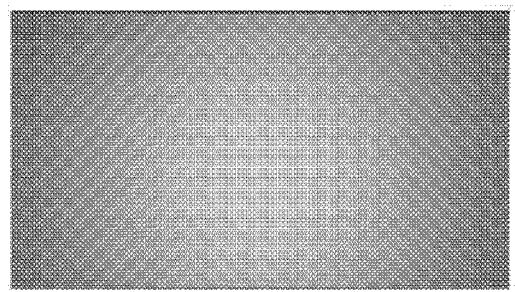

On the other hand, in the spectral sensitivity measuring device 10 according to the first embodiment, as illustrated in FIG. 5B, since the positions (for example, p) of the corresponding pixels are the same between the captured images ii (e.g. ii1, ii2, ii3) of the chart, it is possible to calculate the spectral sensitivity in a state of not including noise in the spatial direction, and thus, the measurement accuracy can be improved.

The chart generation system 100 sequentially generates a plurality of charts ch at a position opposed to the imaging device IS respectively. Therefore, since each chart ch can be imaged by the imaging device IS in a state where the chart ch is directly opposed to the imaging device IS, the spectral sensitivity of the imaging device IS can be accurately measured without taking a long time.

The chart generation system 100 has the light source 110, and the optical filter group 120G including the plurality of optical filters 120 which are selectively disposed between the light source 110 and the imaging device IS. Therefore, it is possible to generate the plurality of charts ch at a position opposed to the imaging device IS respectively with a smaller number of parts.

The chart generation system 100 further includes the moving mechanism 130 that moves the optical filter group 120G and a system including the imaging device IS and the light source 110 relatively such that the plurality of optical filters 120 is sequentially positioned between the imaging device IS and the light source 110 respectively. Therefore, it is possible to sequentially position each of the plurality of optical filters 120 between the imaging device IS and the light source 110 with a relatively simple configuration.

The moving mechanism 130 moves the plurality of optical filters 120 in a direction substantially orthogonal to the arrangement direction of the imaging device IS and the light source 110. Therefore, the plurality of optical filters 120 can be moved between the imaging device IS and the light source 110 even in a state where an interval between the imaging device IS and the light source 110 is reduced (even in a state where the dimension in the height direction of the device is shortened).

The moving mechanism 130 has the turret 130a as a rotating member in which the plurality of optical filters 120 is disposed along the circumferential direction, and which is rotatable around an axis substantially parallel to the arrangement direction of the imaging device IS and the light source 110, and the motor 130c as a driving unit which rotates the turret 130a around the axis. Therefore, it is possible to revolve the plurality of optical filters 120, and thus, the spectral sensitivity of the imaging device IS can be efficiently and accurately measured.

The chart generation system 100 includes the diffusion plate 140 disposed between the imaging device IS and each of the plurality of optical filters 120. Therefore, each optical filter 120 and the turret 130a can be downsized, and consequently, the device can be downsized.

The processing system 1000 includes the pixel value acquisition unit 1000a that acquires the pixel value of the captured image of the chart ch by the imaging device IS, and the spectral sensitivity calculation unit 1000b that calculates the spectral sensitivity of the imaging device IS on the basis of the spectral characteristic A of the chart ch and the pixel value acquired by the pixel value acquisition unit 1000a. Therefore, it is possible to measure the spectral sensitivity of the imaging device IS stably and accurately.

A spectral sensitivity measuring method using the spectral sensitivity measuring device 10 according to the first embodiment includes: a step of generating a chart ch including at least one chart portion having at least one color region at a position opposed to the imaging device IS; a step of imaging the chart ch generated at the position opposed to the imaging device IS by the imaging device IS; a step of acquiring a pixel value of the captured image of the chart ch imaged in the imaging step; and a step of calculating the spectral sensitivity of the image sensor on the basis of the spectral characteristic A of the chart ch and the pixel value acquired in the acquiring step described above.

According to this spectral sensitivity measuring method, it is possible to measure the spectral sensitivity of the imaging device IS accurately.

In the generating step described above, the plurality of charts ch is sequentially generated at a position opposed to the imaging device IS respectively. Therefore, it is possible to measure the spectral sensitivity of the imaging device IS efficiently and accurately.

<3. Spectral Sensitivity Measuring Device According to a Modification of the First Embodiment of the Present Technology>

Figure 7A:
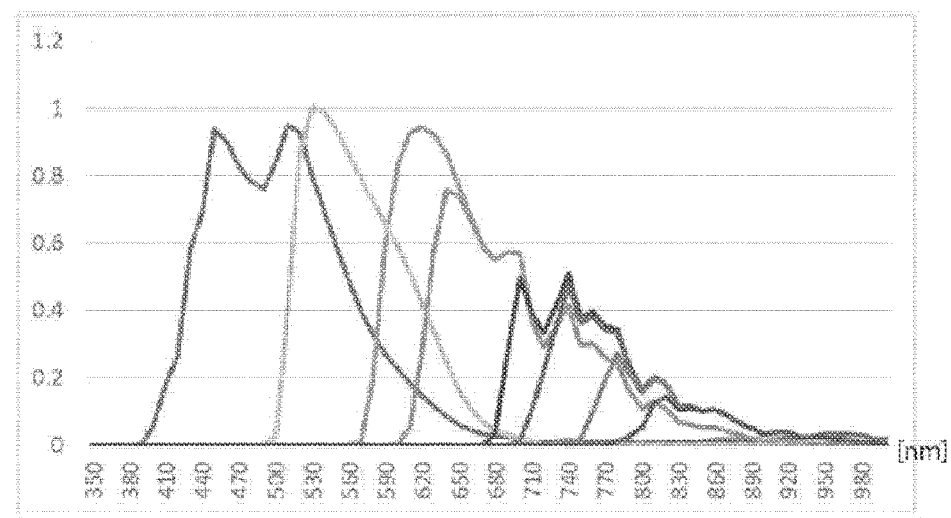
FIGS. 7A and 7B are diagrams for explaining an advantage 4 of the spectral sensitivity measuring device in FIG. 1.

Hereinafter, a spectral sensitivity measuring device according to a modification of the first embodiment of the present technology will be explained with reference to the drawings. FIG. 7A is a graph illustrating a light quantity luminance value for each color region (for each wavelength) of the chart ch corresponding to each optical filter when the plurality of (for example, eight) optical filters is moved at a constant speed and are imaged in the same imaging time by the imaging device IS in the spectral sensitivity measuring device 10 according to the first embodiment.

In FIG. 7A, in particular, it can be seen that the luminance values, on the long wavelength side (for example, 700 nm or more), of a part of charts ch are low. This is because the light quantity, on the long wavelength side, of the part of charts ch is low. In this case, since the pixel value, on the long wavelength side, of the captured image is also low and is easily affected by noise, and thus, there is a possibility that the measurement accuracy of the spectral sensitivity becomes lower.

Hence, in the spectral sensitivity measuring device according to a modification of the first embodiment, the control unit 180 preferably controls the imaging time during which the imaging device IS images the chart ch, and/or the time during which the imaging device IS and the chart ch are opposed to each other, and/or at least one of the light emission intensity or the light emission time of the light source 110 (for example, the pulse amplitude and the pulse width of a pulse signal for driving the light source 110), in accordance with the light quantity for each wavelength of each of the plurality of (for example, four) optical filters 120.

Specifically, when the chart ch is generated by the optical filter 120 having a low transmittance on the long wavelength side, for example, as compared with when the chart ch is generated by the optical filter 120 other than this optical filter 120, the control unit 180 sets the imaging time of the imaging device IS longer, and/or sets the time during which the imaging device IS and the chart ch are opposed to each other longer, and/or sets the light emission intensity of the light source 110 stronger, and/or sets the light emission time longer.

Figure 7B:
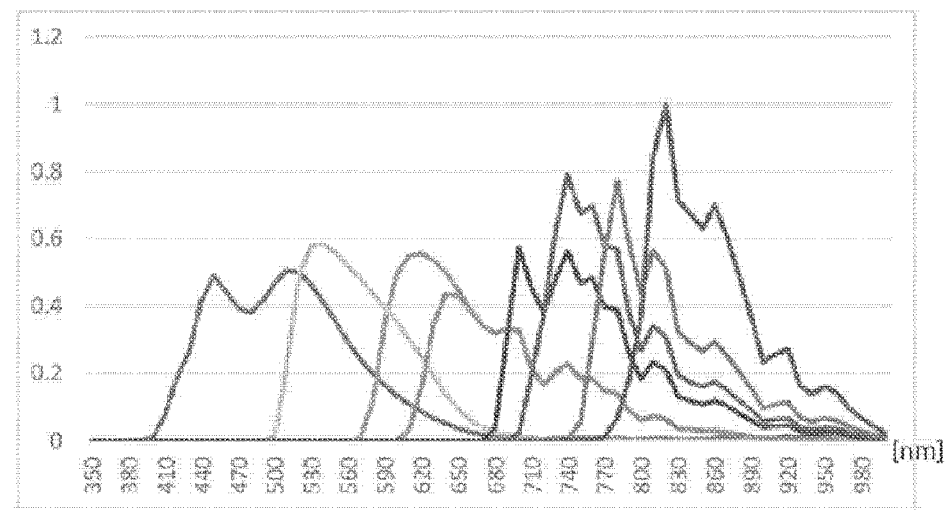

Therefore, for example, as illustrated in FIG. 7B, it is possible to increase the luminance values, on the long wavelength side, of the part of charts ch, and thus, a sufficient pixel value can be obtained in the entire wavelength band, whereby the measurement accuracy of the spectral sensitivity can be improved.

<4. Spectral Sensitivity Measuring Device According to Example 1 of the Second Embodiment of the Present Technology>

Figure 8:
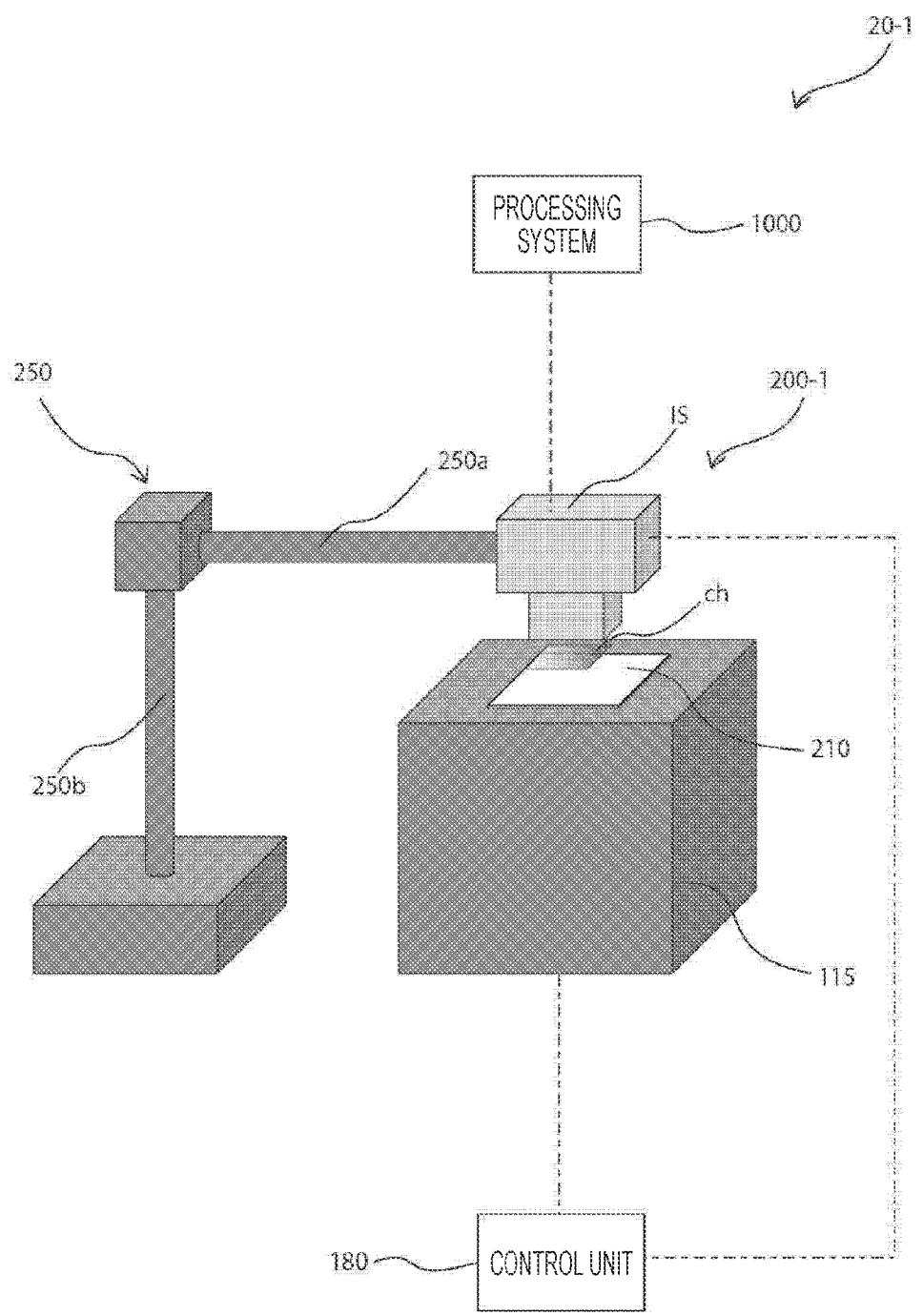
FIG. 8 is a diagram schematically illustrating a configuration of a spectral sensitivity measuring device according to Example 1 in a second embodiment of the present technology.

Hereinafter, a spectral sensitivity measuring device according to Example 1 of the second embodiment of the present technology will be explained with reference to FIG. 8. FIG. 8 is a diagram (perspective view) schematically illustrating a configuration of a spectral sensitivity measuring device 20-1 according to Example 1 of the second embodiment.

The spectral sensitivity measuring device 20-1 has a configuration substantially similar to that of the spectral sensitivity measuring device 10 according to the first embodiment except that a chart generation system 200-1 has a variable wavelength light source 210 instead of the light source 110 and does not include the optical filter group 120G and the moving mechanism 130. The variable wavelength light source 210 is a light source having a variable light emission wavelength.

In the spectral sensitivity measuring device 20-1, the variable wavelength light source 210 is opposed to the imaging device IS. Here, as one example, the imaging device IS is held at the tip end portion of an arm 250a of a support structure body 250 including a support column 250b and the arm 250a in an attachable/detachable manner so as to be opposed to the variable wavelength light source 210. Note that the diffusion plate 140 that diffuses a light from the variable wavelength light source 210 may be disposed between the variable wavelength light source 210 and the imaging device IS.

The variable wavelength light source 210 emits a light having an arbitrary wavelength (for example, a light of R, G, B) to generate a chart ch at a position opposed to the imaging device IS. As the variable wavelength light source 210, for example, a light emitting diode, a semiconductor laser, or the like can be used.

In the spectral sensitivity measuring device 20-1, the control unit 180 sequentially generates a plurality of charts ch at a position opposed to the imaging device IS respectively, by changing the light emission wavelength of the variable wavelength light source 210. The control unit 180 causes the imaging device IS to image each chart ch generated at a position opposed to the imaging device IS.

According to the spectral sensitivity measuring device 20-1, it is possible to provide a spectral sensitivity measuring device capable of accurately measuring the spectral sensitivity of the imaging device IS with a simple configuration.

<5. Spectral Sensitivity Measuring Device According to Example 2 of the Second Embodiment of the Present Technology>

Figure 9:
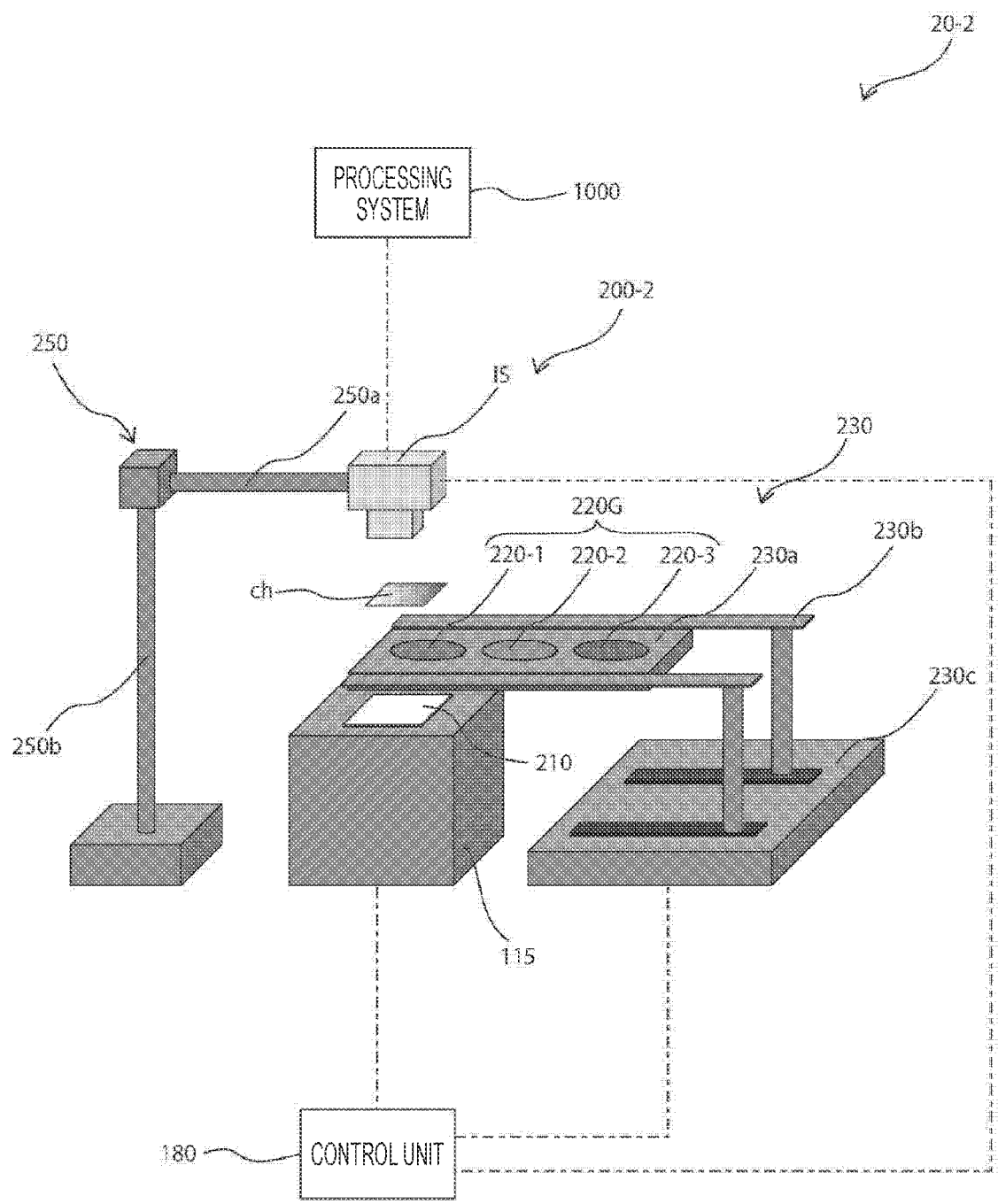
FIG. 9 is a diagram schematically illustrating a configuration of a spectral sensitivity measuring device according to Example 2 in the second embodiment of the present technology.

Hereinafter, a spectral sensitivity measuring device according to Example 2 of the second embodiment of the present technology will be explained with reference to FIG. 9. FIG. 9 is a diagram (perspective view) schematically illustrating a configuration of a spectral sensitivity measuring device 20-2 according to Example 2 of the second embodiment.

The spectral sensitivity measuring device 20-2 has a configuration substantially similar to that of the spectral sensitivity measuring device 20-1 according to Example 1 except that a chart generation system 200-2 has an optical filter group 220G including a plurality of (for example, three) optical filters 220 (for example, first to third optical filters 220-1 to 220-3) which is selectively disposed between the imaging device IS and the variable wavelength light source 210.

A first optical filter 220-1 is, for example, a high-pass filter, a second optical filter 220-2 is, for example, a band-pass filter, and a third optical filter 220-3 is, for example, a low-pass filter.

As one example, the chart generation system 200-2 further includes a moving mechanism 230 that moves the optical filter group 220G and a system including the imaging device IS and the variable wavelength light source 210 relatively such that the plurality of optical filters 220 is sequentially positioned between the imaging device IS and the variable wavelength light source 210 respectively.

As one example, the moving mechanism 230 moves the plurality of optical filters 220 in a direction substantially orthogonal to the arrangement direction (for example, the vertical direction) of the imaging device IS and the variable wavelength light source 210.

As one example, the plurality of optical filters 220 is one-dimensionally arranged within a horizontal surface. The moving mechanism 230 moves the optical filter group 220G in one axial direction along the arrangement direction of the plurality of optical filters 220.

As one example, the moving mechanism 230 includes a holding member 230a that holds the plurality of optical filters 220, a movable support member 230b that supports the holding member 230a at a height position between the imaging device IS and the variable wavelength light source 210, and a linear motor 230c that moves the movable support member 230b in the one axial direction described above. The linear motor 230c is controlled by the control unit 180.

The control unit 180 controls the linear motor 230c to position one of the plurality of optical filters 220 between the imaging device IS and the variable wavelength light source 210, turn on the variable wavelength light source 210, generate a chart ch corresponding to the optical filter 220 (specifically, a chart ch generated by a light having a wavelength of a pass band of the optical filter 220) at a position opposed to the imaging device IS, so as to cause the imaging device IS to image the chart. By performing this series of operations for each optical filter 220, the control unit 180 acquires the captured image of the chart ch corresponding to each optical filter 220, and outputs the captured image to the processing system 1000. The processing system 1000 calculates the spectral sensitivity of the imaging device IS on the basis of the captured image.

According to the spectral sensitivity measuring device 20-2, an effect similar to that of the spectral sensitivity measuring device 20-1 according to Example 1 is obtained, and furthermore, a chart ch can be generated from a light having a narrower wavelength band, and thus, it is possible to measure the spectral sensitivity specialized for the narrower wavelength band.

<6. Spectral Sensitivity Measuring Device According to Example 1 of the Third Embodiment of the Present Technology>

Figure 10:
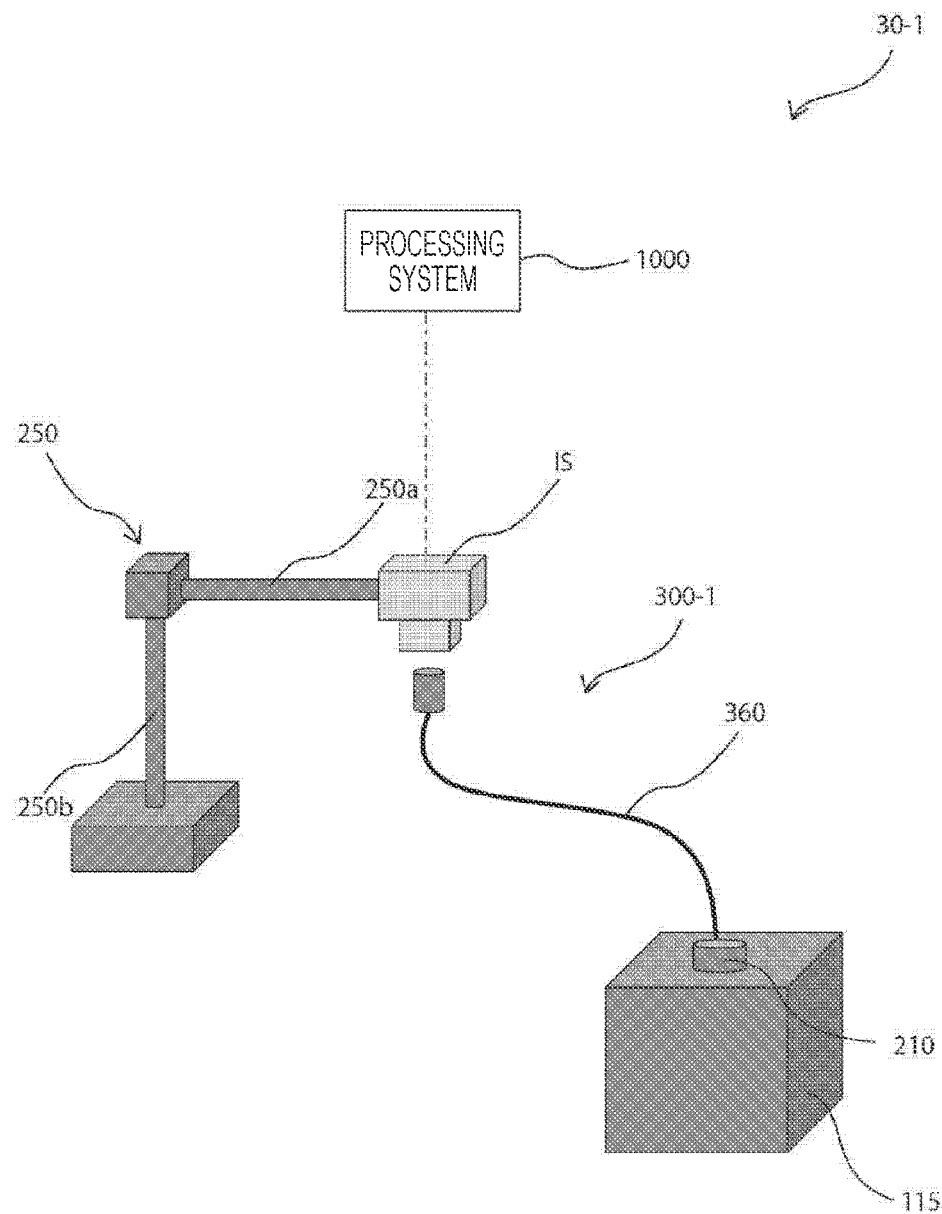
FIG. 10 is a diagram schematically illustrating a configuration of a spectral sensitivity measuring device according to Example 1 in a third embodiment of the present technology.

Hereinafter, a spectral sensitivity measuring device according to Example 1 of the third embodiment of the present technology will be explained with reference to FIG. 10. FIG. 10 is a diagram (perspective view) schematically illustrating a configuration of a spectral sensitivity measuring device 30-1 according to Example 1 of the third embodiment.

As illustrated in FIG. 10, the spectral sensitivity measuring device 30-1 has a configuration substantially similar to that of the spectral sensitivity measuring device 20-1 according to Example 1 of the second embodiment except that a chart generation system 300-1 has an optical fiber cable 360, as an optical waveguide member, with an incident end connected to the variable wavelength light source 210 and an emission end opposed to the imaging device IS. The operation of the spectral sensitivity measuring device 30-1 is substantially similar to the operation of the spectral sensitivity measuring device 20-1. As one example, the emission end of the optical fiber cable 360 is supported at a position opposed to the corresponding imaging device IS by a movable support stand.

According to the spectral sensitivity measuring device 30-1, since it is possible to improve the compactness and the operability, the mobility of a portion, opposed to the imaging device IS, of the chart generation system 300-1, a favorable usability is provided in a case where, for example, the spectral sensitivities of the plurality of imaging devices IS are measured successively.

<7. Spectral Sensitivity Measuring Device According to Example 2 of the Third Embodiment of the Present Technology>

Figure 11:
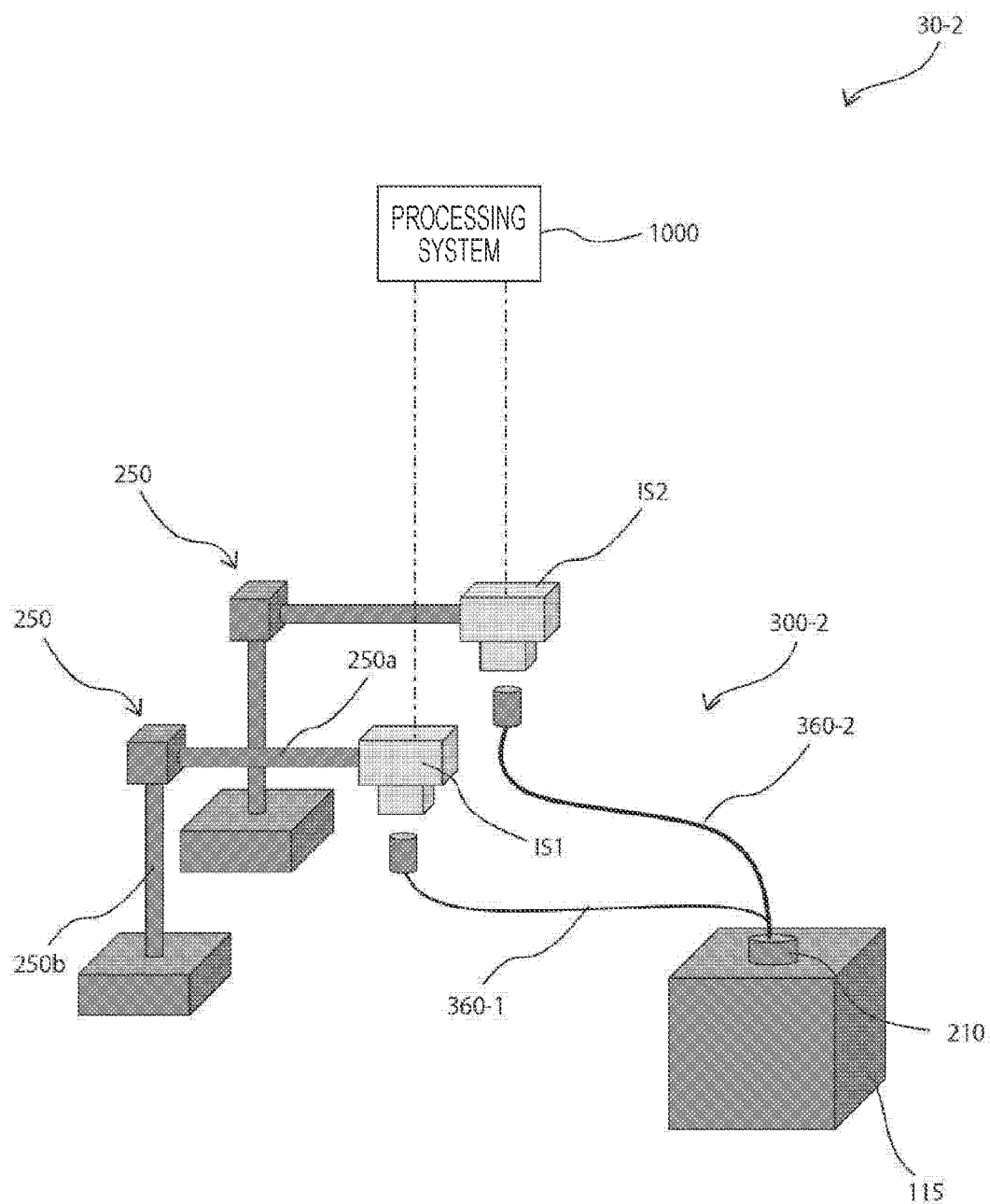
FIG. 11 is a diagram schematically illustrating a configuration of a spectral sensitivity measuring device according to Example 2 in the third embodiment of the present technology.

Hereinafter, a spectral sensitivity measuring device according to Example 2 of the third embodiment of the present technology will be explained with reference to FIG. 11. FIG. 11 is a diagram (perspective view) schematically illustrating a configuration of a spectral sensitivity measuring device 30-2 according to Example 2 of the third embodiment.

In the spectral sensitivity measuring device 30-2, as illustrated in FIG. 11, a chart generation system 300-2 includes optical fiber cables 360 (for example, optical fiber cables 360-1 and 360-2) as a plurality of (for example, two) optical waveguide members corresponding to a plurality of (for example, two) imaging devices IS (for example, the imaging devices IS-1, IS-2), and each of the plurality of optical fiber cables 360 has a configuration similar to the spectral sensitivity measuring device 30-1 according to Example 1 except that an incident end is connected to the variable wavelength light source 210 and an emission end is opposed to the corresponding imaging device IS. The operation of the spectral sensitivity measuring device 30-2 is substantially similar to the operation of the spectral sensitivity measuring device 30-1. As one example, the emission end of each optical fiber cable 360 is supported at a position opposed to the corresponding imaging device IS by a movable support stand.

According to the spectral sensitivity measuring device 30-2, an effect similar to that of the spectral sensitivity measuring device 30-1 according to Example 1 is obtained, and furthermore, a plurality of (for example, two) optical fiber cables 360 is branch-connected to one variable wavelength light source 210, so that the spectral sensitivities of the plurality of imaging devices IS can be measured in parallel with a smaller number of parts. Accordingly, the spectral sensitivity measuring device 30-2 is effective in that, for example, the spectral sensitivities of the plurality of imaging devices IS can be measured in a short time. Note that three or more optical fiber cables 360 may be branch-connected to one variable wavelength light source 210.

<8. Spectral Sensitivity Measuring Device According to Example 1 of the Fourth Embodiment of the Present Technology>

Figure 12:
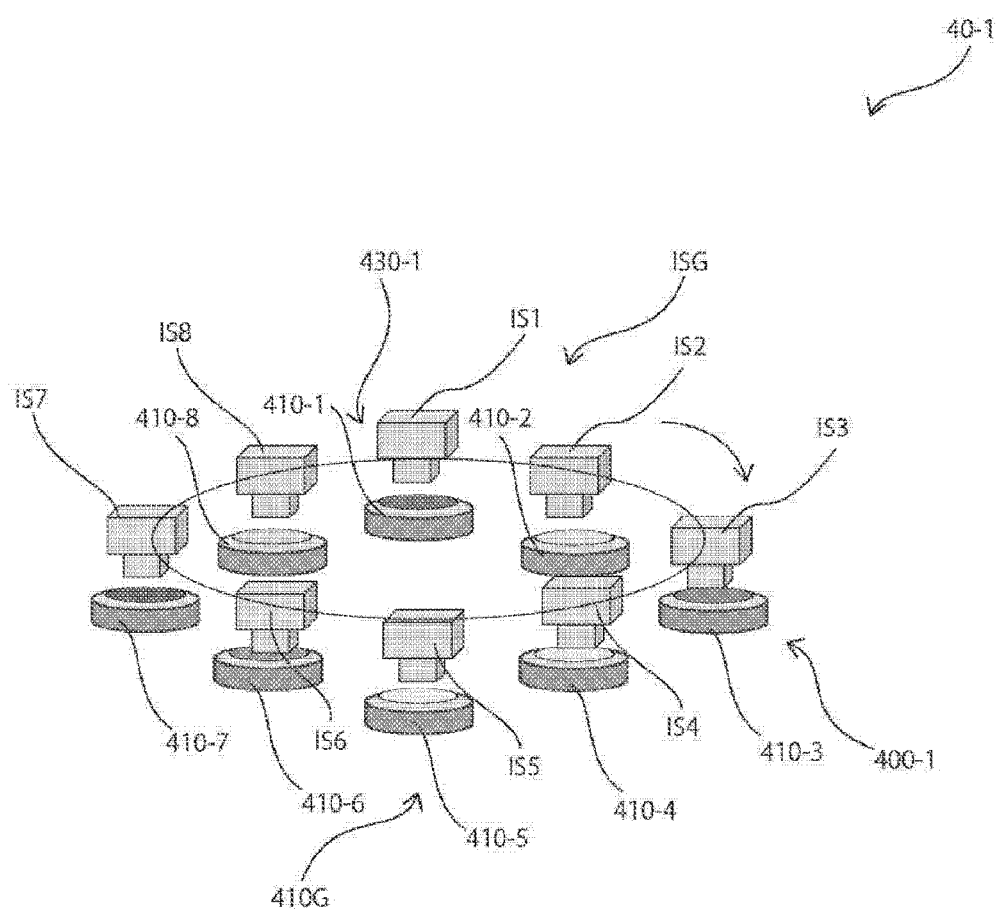
FIG. 12 is a diagram schematically illustrating a configuration of a spectral sensitivity measuring device according to Example 1 in a fourth embodiment of the present technology.

Hereinafter, a spectral sensitivity measuring device according to Example 1 of the fourth embodiment of the present technology will be explained with reference to FIG. 12. FIG. 12 is a diagram (perspective view) schematically illustrating a configuration of a spectral sensitivity measuring device 40-1 according to Example 1 of the fourth embodiment.

In the spectral sensitivity measuring device 40-1, the chart generation system 400-1 includes a light source group 410G including a plurality of (for example, eight) light sources 410 (for example, eight light sources 410-1 to 410-8) having different light emission wavelengths, and a moving mechanism 430-1 that relatively moves the light source group 410G and the imaging device IS such that each of the plurality of light sources 410 and the imaging device IS are opposed to each other sequentially.

More specifically, the chart generation system 400-1 includes the light source group 410G including a plurality of (for example, eight) light sources 410 (for example, eight light sources 410-1 to 410-8) having different light emission wavelengths, and the moving mechanism 430-1 that relatively moves the light source groups 410G and an image sensor group ISG including a plurality of (for example, eight) imaging devices IS (for example, eight light imaging devices IS-1 to IS-8) such that each of the plurality of light sources 410 and each of the plurality of imaging devices IS are opposed to each other sequentially.

As one example, the moving mechanism 430-1 moves the image sensor group ISG with respect to the light source group 410G.

As one example, the plurality of light sources 410 (for example, eight light sources 410-1 to 410-8) is held by a light source holding member so as to be disposed at substantially equal intervals on a circumference.

As one example, the plurality of imaging devices IS (for example, eight imaging devices IS-1 to IS-8) is held by a sensor holding member in an attachable/detachable manner so as to be disposed at substantially equal intervals (substantially equal angular intervals) on a circumference which is positioned coaxially with and has the same radius as a circle on which the plurality of light sources 410 is disposed. The sensor holding member is rotatable about an axis passing through centers of the two circles described above. The sensor holding member is rotationally driven around the axis by, for example, a motor. The motor is controlled by a control unit.

The control unit controls the abovementioned motor so that the plurality of light sources 410 and the plurality of imaging devices IS are opposed to each other on a one-to-one basis.

More specifically, the control unit firstly generates a chart ch in each of eight sets of the light source 410 and the imaging device IS which are opposed to each other, and causes a corresponding imaging device IS to image the chart ch. Next, the control unit controls the motor to rotate the sensor holding member by a predetermined angle (for example, 45°), generates a chart ch in each of the other eight sets of the light source 410 and the imaging device IS which are opposed to each other, and causes a corresponding imaging device IS to image the chart ch. The control unit repeats this operation until the charts ch are imaged in all of the combinations of the light sources 410 and the imaging devices IS.

According to the spectral sensitivity measuring device 40-1, by rotating the image sensor group ISG to change a combination of multiple sets (for example, eight sets) of a light source 410 and an imaging device IS that are opposed to each other, it is possible to cause each imaging device IS to be opposed to each of the plurality of light sources 410 sequentially to image the chart ch, so that the spectral sensitivities of the plurality of (for example, eight) imaging devices IS can be measured in parallel. That is, it is possible to measure the spectral sensitivities of the plurality of imaging devices IS in a short time.

<9. Spectral Sensitivity Measuring Device According to Example 2 of the Fourth Embodiment of the Present Technology>

Figure 13:
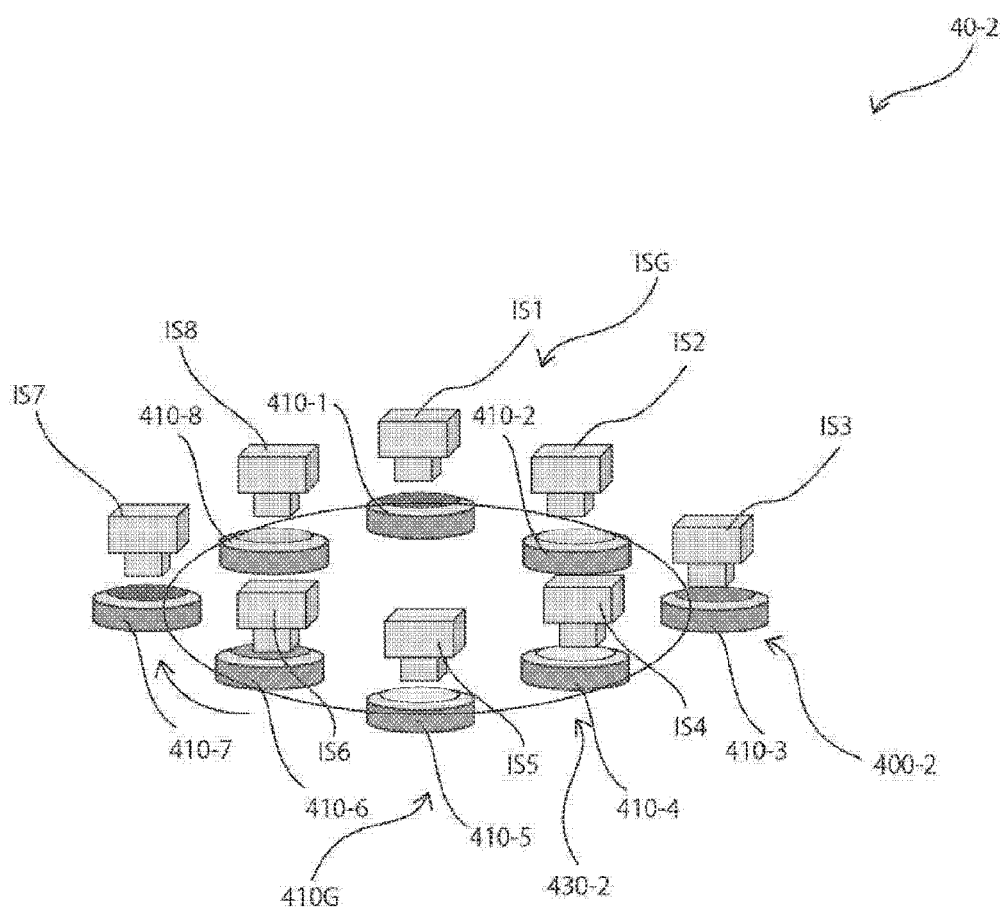
FIG. 13 is a diagram schematically illustrating a configuration of a spectral sensitivity measuring device according to Example 2 in the fourth embodiment of the present technology.

Hereinafter, a spectral sensitivity measuring device according to Example 2 of the fourth embodiment of the present technology will be explained with reference to FIG. 13. FIG. 13 is a diagram (perspective view) schematically illustrating a configuration of a spectral sensitivity measuring device 40-2 according to Example 2 of the fourth embodiment.

The spectral sensitivity measuring device 40-2 has a configuration similar to the spectral sensitivity measuring device 40-1 according to Example 1 except that the moving mechanism 430-2 of the chart generation system 400-2 moves the light source group 410G with respect to the image sensor group ISG.

That is, in the spectral sensitivity measuring device 40-2, the light source holding member, instead of the sensor holding member, is rotationally driven by, for example, a motor.

According to the spectral sensitivity measuring device 40-2, an operation similar to that of the spectral sensitivity measuring device 40-1 according to Example 1 (however, an operation target is reversed) is performed and a similar effect is obtained.

<10. Spectral Sensitivity Measuring Device According to the Fifth Embodiment of the Present Technology>

Figure 14:
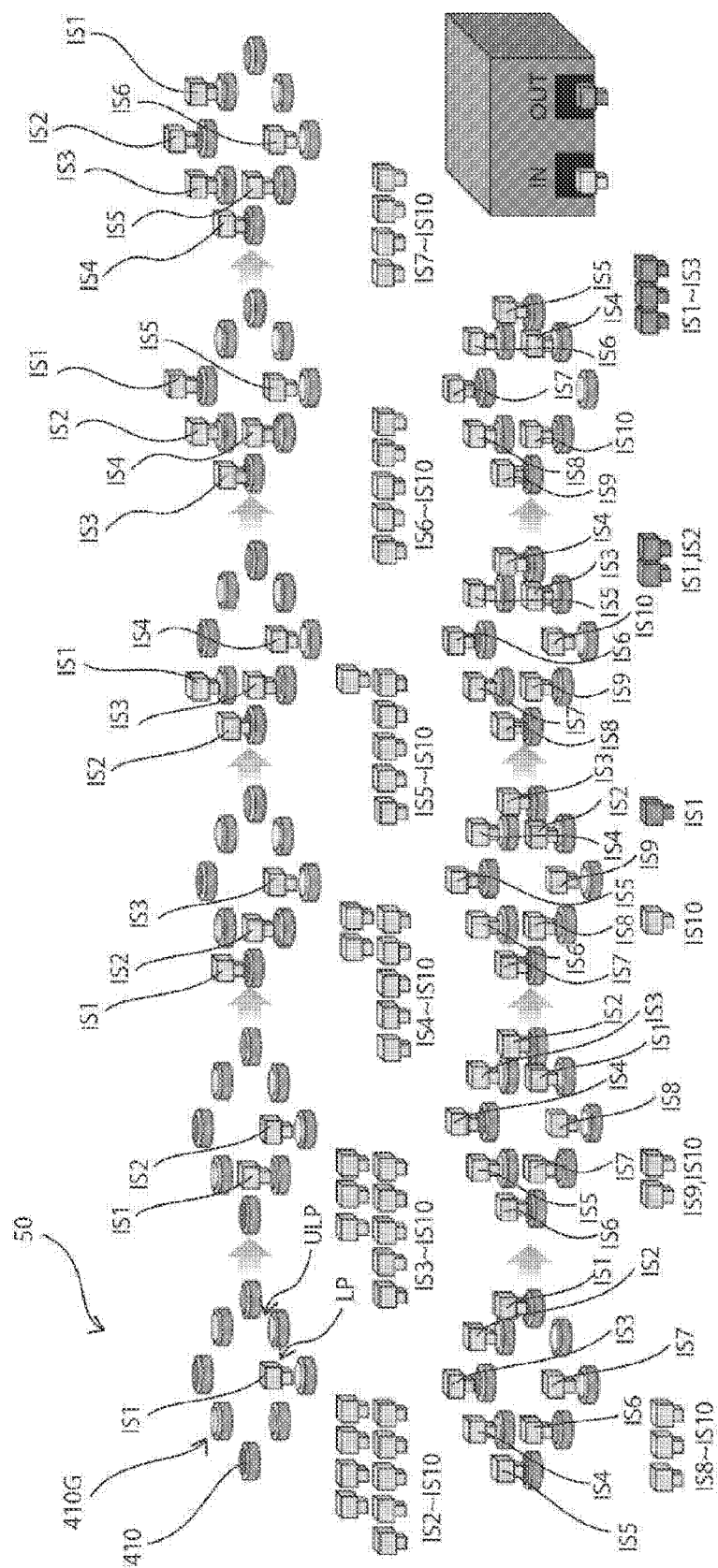
FIG. 14 is a diagram schematically illustrating an operation sequence and a configuration of a spectral sensitivity measuring device according to a fifth embodiment of the present technology.

Hereinafter, a spectral sensitivity measuring device according to the fifth embodiment of the present technology will be explained with reference to FIG. 14. FIG. 14 is a diagram schematically illustrating an operation sequence and a configuration of a spectral sensitivity measuring device 50 according to the fifth embodiment.

As illustrated in FIG. 14, the spectral sensitivity measuring device 50 has a configuration substantially similar to that of the spectral sensitivity measuring device 40-1 according to Example 1 of the fourth embodiment except that the plurality of (for example, 10) imaging devices IS (for example, imaging devices IS1 to IS10) is sequentially carried into a first position (also referred to as a load position LP) that is a position opposed to the initial (first) light source 410 in the light source group 410G and are sequentially carried out from an eighth position (also referred to as an unload position ULP) that is a position opposed to the last (eighth) light source 410, respectively. Positions where the imaging device IS are opposed to the second to seventh light sources 410 are referred to as second to seventh positions, respectively. Each image sensor is attached to the sensor holding member at the load position LP and is detached from the sensor holding member at the unload position ULP.

The operation sequence of the spectral sensitivity measuring device 50 will be explained. Here, the spectral sensitivities of a plurality of (for example, 10) imaging devices IS (for example, imaging devices IS1 to IS10) are measured successively.

(First sequence) The imaging device IS1 is carried into the first position (load position LP), and a chart ch is generated and imaged at the first position. The imaging devices IS2 to IS10 are in a standby state.

(Second sequence) The imaging device IS1 is moved to the second position, the imaging device IS2 is carried into the first position, and a chart ch is generated and imaged at each position. The imaging devices IS3 to IS10 are in a standby state.

(Third sequence) The imaging devices IS1 and IS2 are respectively moved to the third position and the second position, the imaging device IS3 is carried into the first position, and a chart ch is generated and imaged at each position. The imaging devices IS4 to IS10 are in a standby state.

(Fourth sequence) The imaging devices IS1, IS2, and IS3 are respectively moved to the fourth position, the third position, and the second position, the imaging device IS4 is carried into the first position, and a chart ch is generated and imaged at each position. The imaging devices IS5 to IS10 are in a standby state.

(Fifth sequence) The imaging devices IS1, IS2, IS3, and IS4 are respectively moved to the fifth position, the fourth position, the third position, and the second position, the imaging device IS5 is carried into the first position, and a chart ch is generated and imaged at each position. The imaging devices IS6 to IS10 are in a standby state.

(Sixth sequence) The imaging devices IS1, IS2, IS3, IS4, and IS5 are respectively moved to the sixth position, the fifth position, the fourth position, the third position, and the second position, the imaging device IS6 is carried into the first position, and a chart ch is generated and imaged at each position. The imaging devices IS7 to IS10 are in a standby state.

(Seventh sequence) The imaging devices IS1, IS2, IS3, IS4, IS5, and IS6 are respectively moved to the seventh position, the sixth position, the fifth position, the fourth position, the third position, and the second position, the imaging device IS7 is carried into the first position, and a chart ch is generated and imaged at each position. The imaging devices IS8 to IS10 are in a standby state.

(Eighth sequence) The imaging devices IS1, IS2, IS3, IS4, IS5, IS6, and IS7 are respectively moved to the eighth position, the seventh position, the sixth position, the fifth position, the fourth position, the third position, and the second position, the imaging device IS8 is carried into the first position, and a chart ch is generated and imaged at each position. Thereafter, the spectral sensitivity of the imaging device IS1 is calculated on the basis of the captured images acquired at the first to eighth positions respectively, and the imaging device IS1 is carried out. The imaging devices IS9 and IS10 are in a standby state.

(Ninth sequence) The imaging devices IS2, IS3, IS4, IS5, IS6, IS7, and IS8 are respectively moved to the eighth position, the seventh position, the sixth position, the fifth position, the fourth position, the third position, and the second position, the imaging device IS9 is carried into the first position, and a chart ch is generated and imaged at each position. Thereafter, the spectral sensitivity of the imaging device IS2 is calculated on the basis of the captured images acquired at the first to eighth positions respectively, and the imaging device IS2 is carried out. The imaging device IS10 is in a standby state.

(Tenth sequence) The imaging devices IS3, IS4, IS5, IS6, IS7, IS8, and IS9, are respectively moved to the eighth position, the seventh position, the sixth position, the fifth position, the fourth position, the third position, and the second position, the imaging device IS10 is carried into the first position, and a chart ch is generated and imaged at each position. Thereafter, the spectral sensitivity of the imaging device IS3 is calculated on the basis of the captured images acquired at the first to eighth positions respectively, and the imaging device IS3 is carried out.

(Eleventh sequence) The imaging devices IS4, IS5, IS6, IS7, IS8, IS9, and IS10 are respectively moved to the eighth position, the seventh position, the sixth position, the fifth position, the fourth position, the third position, and the second position, and a chart ch is generated and imaged at each position. Thereafter, the spectral sensitivity of the imaging device IS4 is calculated on the basis of the captured images acquired at the first to eighth positions respectively, and the imaging device IS4 is carried out.

As described above, the first to eleventh sequences have been explained. As the subsequent sequences are performed in a similar manner, the explanation thereof is omitted.

According to the spectral sensitivity measuring device 50, since generating and imaging a chart ch are performed in parallel by sequentially causing each of the plurality of imaging device IS and each of the plurality of light sources 410 to be opposed to each other, it is effective in that, in a case of continuously measuring the spectral sensitivities of a large number of imaging devices IS, the measurement is efficiently performed.

<11. Spectral Sensitivity Measuring Device According to the Sixth Embodiment of the Present Technology>

Hereinafter, a spectral sensitivity measuring device according to the sixth embodiment of the present technology will be explained with reference to the drawings.

Meanwhile, in a spectral sensitivity measuring device, there is a problem that the luminance changes in the chart due to the influence of the luminance unevenness of a light source and the shading of a lens. In response to this problem, a method has been proposed in which a white color (the spectral reflectance is constant regardless of a wavelength) is discretely included in the chart, and shading correction is performed using the white color portion (see, for example, Patent Document 1).

However, in the abovementioned shading correction, for example, it is necessary to provide a white color portion in an optical filter or the like for generating a chart. In addition, it is necessary to perform a shading correction calculation with high accuracy such that the light quantity is uniform in a chart plane.

Therefore, in order to cope with such a problem, the inventors have developed a spectral sensitivity measuring device according to the sixth embodiment.

<<Configuration of Spectral Sensitivity Measuring Device>>

The spectral sensitivity measuring device according to the sixth embodiment has a configuration similar to the spectral sensitivity measuring device 10 according to the first embodiment except that the configuration of the processing system 1000 is partially different therebetween. Note that the spectral sensitivity measuring device according to the sixth embodiment may have the same configuration as any of the spectral sensitivity measuring device according to the modification of the first embodiment, the spectral sensitivity measuring devices 20-1 and 20-2 according to Examples 1 and 2 of the second embodiment, the spectral sensitivity measuring devices 30-1 and 30-2 according to Examples 1 and 2 of the third embodiment, the spectral sensitivity measuring devices 40-1 and 40-2 according to Examples 1 and 2 of the fourth embodiment, the spectral sensitivity measuring device 50 according to the fifth embodiment, and the spectral sensitivity measuring device described in Patent Document 1, except that the configuration of the processing system 1000 is partially different therebetween.

Figure 15:
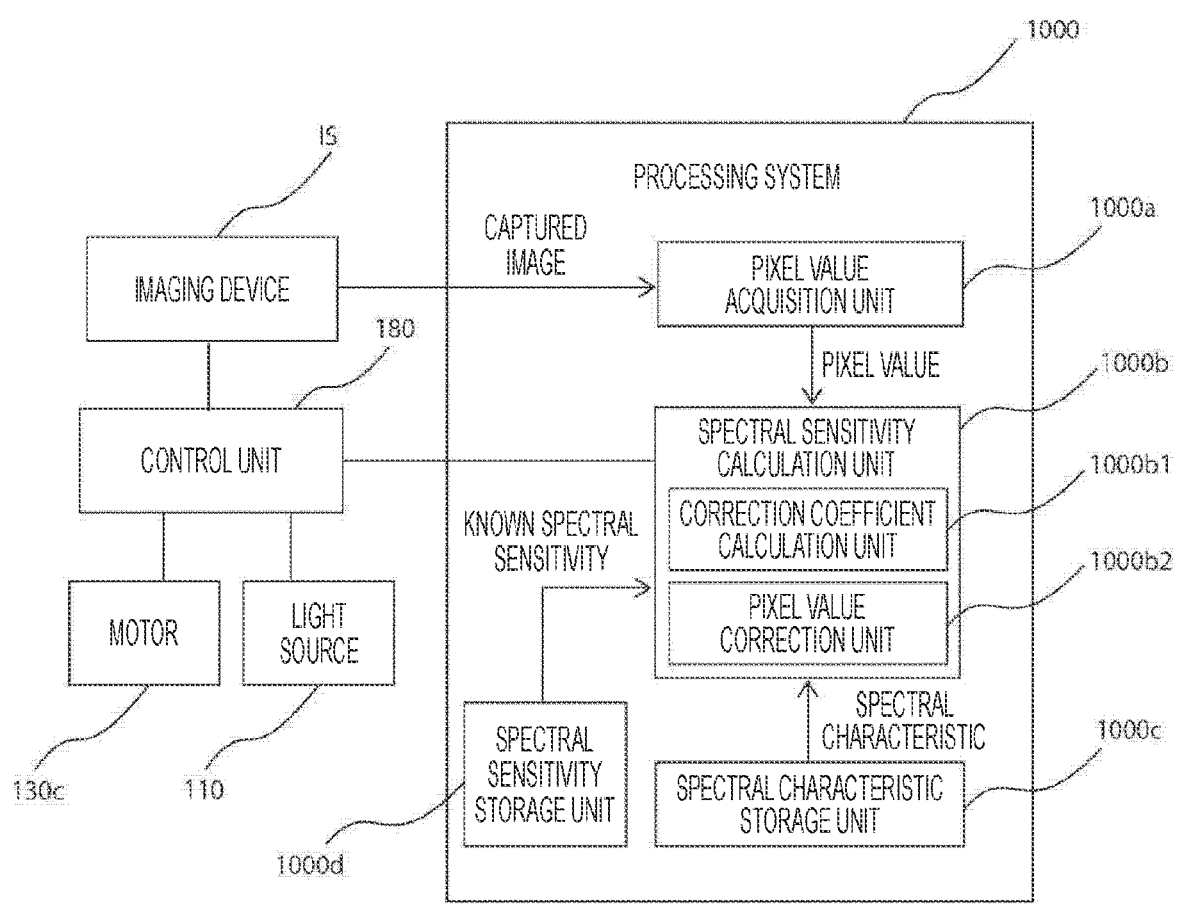
FIG. 15 is a block diagram illustrating functions of a processing system in a spectral sensitivity measuring device according to a sixth embodiment of the present technology.

FIG. 15 is a block diagram illustrating functions of the processing system 1000 in a spectral sensitivity measuring device according to the sixth embodiment.

As one example, in the spectral sensitivity measuring device according to the sixth embodiment, as illustrated in FIG. 15, the spectral sensitivity calculation unit 1000b of the processing system 1000 includes a correction coefficient calculation unit 1000b1 and a pixel value correction unit 1000b2. Note that the processing system 1000 may include a pixel value correction unit and a correction coefficient calculation unit separately from the spectral sensitivity calculation unit.

The processing system 1000 (specifically, the spectral sensitivity calculation unit 1000b) calculates a theoretical pixel value $y_{th}$, which is a theoretical value of a pixel value of a captured image of a chart ch from Formula (F3) described below, calculates a correction coefficient C from Formula (F4) described below, and calculates the spectral sensitivity x from Formula (F5) described below using a corrected pixel value yc obtained by multiplying an actual measurement pixel value y, which is an actual measurement value of a pixel value of a captured image, of the chart ch, different from the captured image by the imaging device IS, by the correction coefficient C.

$$y_{th} = Ax_a \quad (F3)$$

(where $x_a$ is a spectral sensitivity of an image sensor with a known spectral sensitivity, and A is a spectral characteristic of a chart)

$$C = y_{th}/y_a \quad (F4)$$

(where $y_a$ is a pixel value of a captured image by an image sensor with a known spectral sensitivity)

$$y_c = Ax \quad (F5)$$

(where A is a spectral characteristic of a chart)

<<Correction Coefficient Acquisition Processing>>

Figure 16:
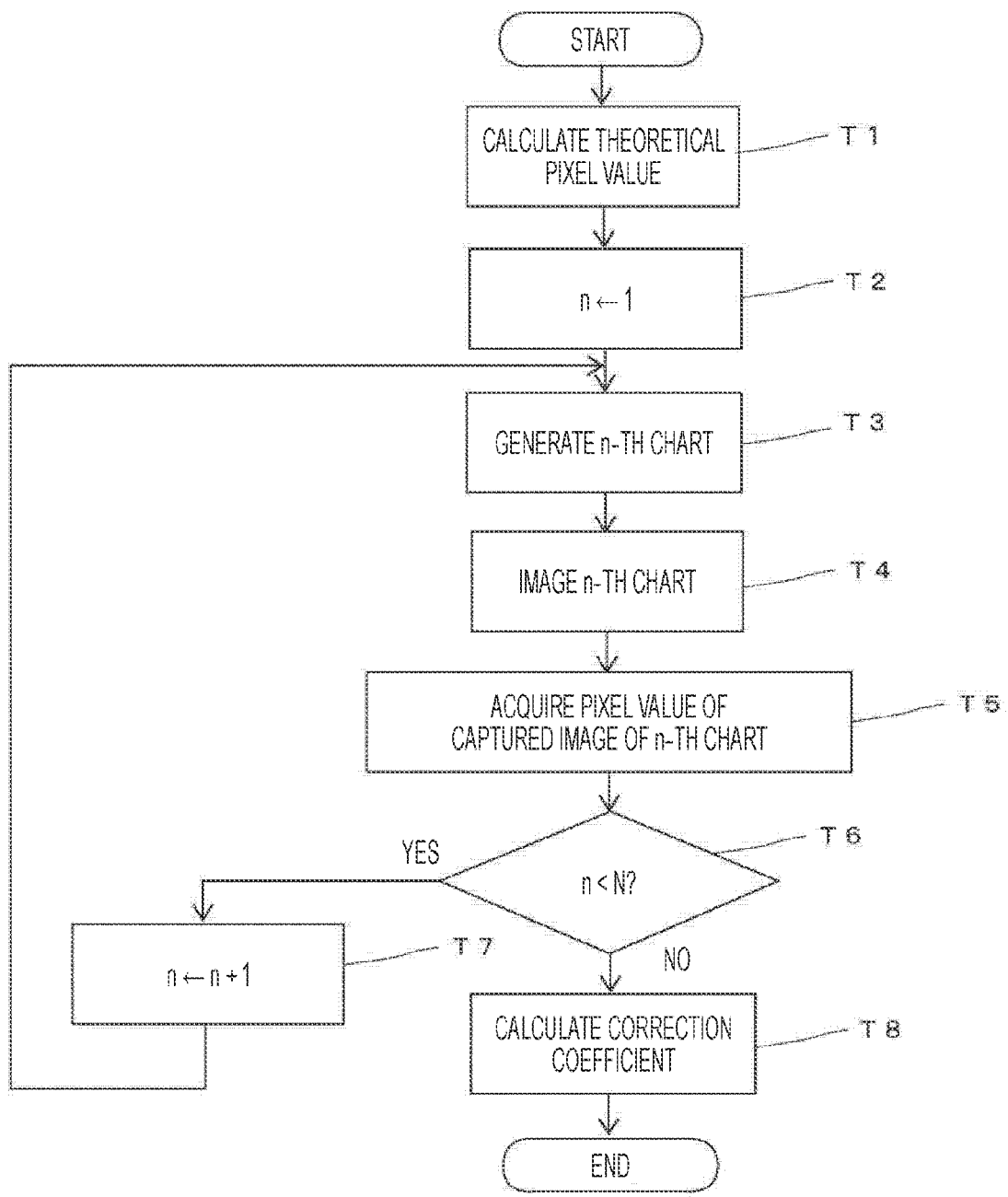
FIG. 16 is a flowchart for explaining a correction coefficient acquisition processing.

Hereinafter, a correction coefficient acquisition processing performed by the spectral sensitivity measuring device of the sixth embodiment will be explained with reference to a flowchart in FIG. 16. The correction coefficient calculation processing is performed using an imaging device ISa with a known spectral sensitivity.

In the spectral sensitivity measuring device of the sixth embodiment, the processing system 1000 has a spectral sensitivity storage unit 1000d that stores therein the spectral sensitivity $X_a$ (known spectral sensitivity) of the imaging device ISa.

The imaging device ISa is attached, in advance, to a tip end portion of the first arm 150a of the support structure body 150 and is located immediately above the light source 110 (see FIG. 1).

In the first step T1, the correction coefficient calculation unit 1000b1 calculates a theoretical pixel value $y_{th}$. Specifically, the correction coefficient calculation unit 1000b1 substitutes the spectral characteristic A of the chart ch stored in the spectral characteristic storage unit 1000c and the spectral sensitivity $x_a$ of the imaging device ISa stored in the spectral sensitivity storage unit 1000d into Formula (F3) described above to calculate the theoretical pixel value $y_{th}$, and stores the theoretical pixel value $y_{th}$ in an internal memory.

In the following step T2, the control unit 180 sets 1 to n.

In the following step T3, the control unit 180 generates the n-th chart. Specifically, the control unit 180 controls the motor 130c to position the n-th optical filter 120-n between the imaging device ISa and the light source 110, and turns on the light source 110. Therefore, the n-th chart is generated at a position opposed to the imaging device ISa.

In the next step T4, the imaging device ISa images the n-th chart. Specifically, the control unit 180 transmits an imaging trigger signal to the imaging device ISa when step T3 is executed. When receiving the imaging trigger signal, the imaging device ISa images the n-th chart, and outputs data of the captured image (signal which has been photoelectrically converted for each pixel) to the pixel value acquisition unit 1000a.

In the following step T5, the pixel value acquisition unit 1000a acquires a pixel value $y_a$ (signal value and luminance value of each pixel) of the captured image of the n-th chart by the imaging device ISa, and outputs the pixel value $y_a$ to the correction coefficient calculation unit 1000b1. The correction coefficient calculation unit 1000b1 stores therein the inputted pixel value $y_a$ in the internal memory.

In the following step T6, the control unit 180 determines whether or not n<N (for example, 8) or less is satisfied. When the determination in step T6 is positive, the process proceeds to step T7, whereas when the determination is negative, the process proceeds to step T8.

In step T7, the control unit 180 increments n. Once step T7 is executed, the process returns to step T3. Therefore, a series of processing in steps T3 to T6 is executed again.

In step T8, the correction coefficient calculation unit 1000b1 calculates a correction coefficient C. Specifically, by substituting the theoretical pixel value $y_{th}$ calculated in step T1 and the pixel value $y_a$ of each chart ch acquired in step T5 into Formula (F4) described above, the correction coefficient C is obtained for each chart ch.

<<Operation of Spectral Sensitivity Measuring Device>>

Hereinafter, the operation of the spectral sensitivity measuring device according to the sixth embodiment (one example of the spectral sensitivity measuring method according to the present technology) will be explained with reference to a flowchart in FIG. 17.

The imaging device IS as a measurement target is attached, in advance, to a tip end portion of the first arm 150a of the support structure body 150 and is located immediately above the light source 110 (see FIG. 1).

In the first step S11, the control unit 180 sets 1 to n.

In the following step S12, the control unit 180 generates the n-th chart. Specifically, the control unit 180 controls the motor 130c to position the n-th optical filter 120-n between the imaging device IS and the light source 110, and turns on the light source 110. Therefore, the n-th chart is generated at a position opposed to the imaging device IS.

Note that the control unit 180 may stop the turret 130a when the n-th optical filter 120 is caused to position between the imaging device IS and the light source 110, but may continue to rotate the turret 130a at a low speed.

In the following step S13, the imaging device IS images the n-th chart. Specifically, the control unit 180 transmits an imaging trigger signal to the imaging device IS when step S12 is executed. When receiving the imaging trigger signal, the imaging device IS images the n-th chart, and outputs data of the captured image (a signal which has been photoelectrically converted for each pixel) to the pixel value acquisition unit 1000a.

In the following step S14, the pixel value acquisition unit 1000a acquires an actual measurement value (actual measurement pixel value y) of a pixel value of the captured image of the n-th chart.

In the next step S15, the pixel value correction unit 1000b2 corrects the acquired pixel value. Specifically, the pixel value correction unit 1000b2 calculates a corrected pixel value $y_c$ by multiplying the actual measurement pixel value y of the captured image of the n-th chart by the correction coefficient C.

In the following step S16, the control unit 180 determines whether or not n<N (for example, 8) or less is satisfied. When the determination in step S16 is positive, the process proceeds to step S17, whereas when the determination is negative, the process proceeds to step S18.

In step S17, the control unit 180 increments n. Once step S17 is executed, the process returns to step S12. Therefore, a series of processing in steps S12 to S16 is executed again.

In step S18, the spectral sensitivity calculation unit 1000b calculates the spectral sensitivity of the imaging device IS. Specifically, the spectral sensitivity calculation unit 1000b measures a spectral sensitivity x of the imaging device IS on the basis of the corrected pixel value $y_c$ for each chart ch acquired in step S15 and the spectral characteristic A of the chart ch. Once step S18 is executed, the flow ends.

Figure 17:
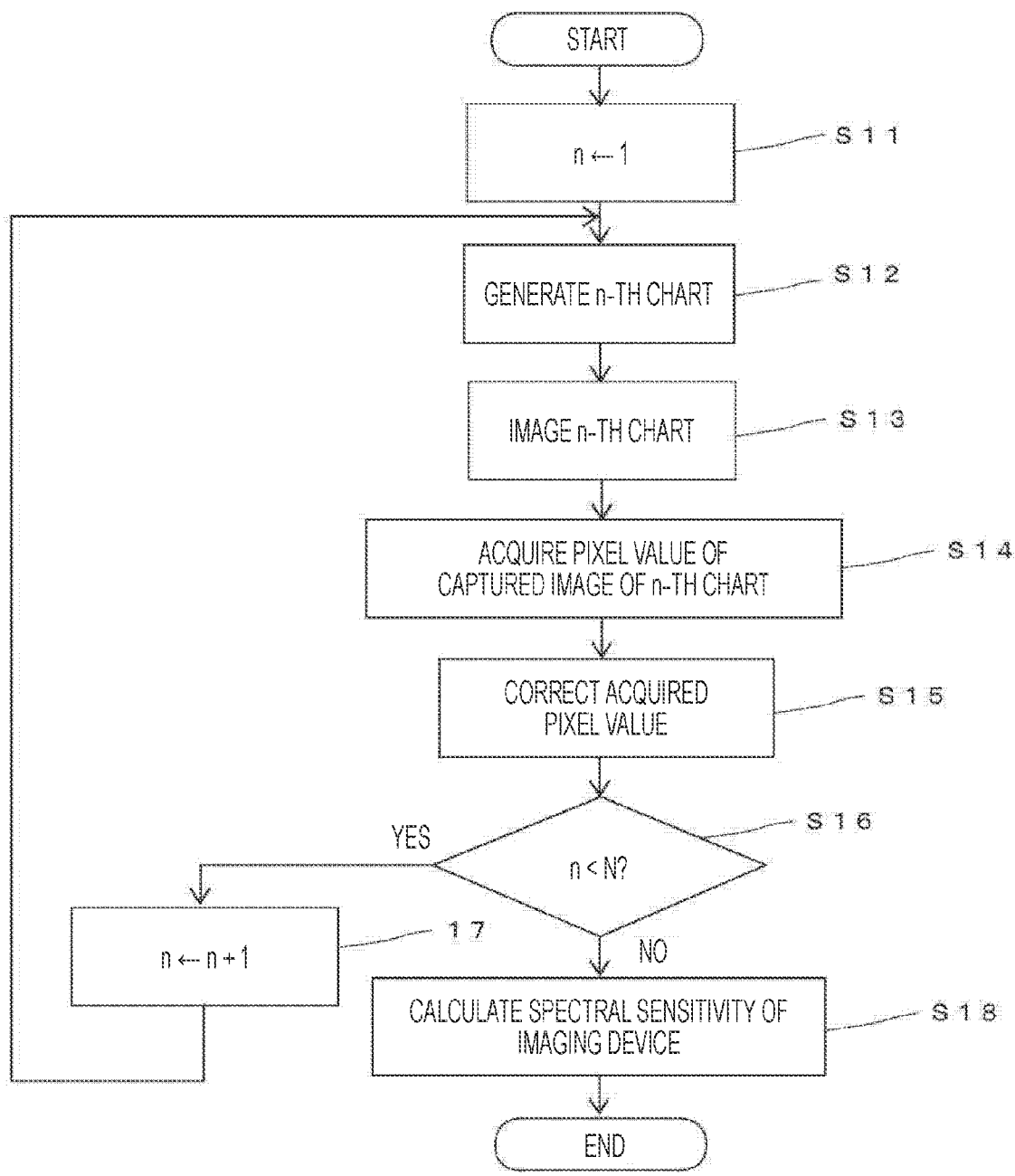
FIG. 17 is a flowchart for explaining an operation of the spectral sensitivity measuring device according to the sixth embodiment of the present technology.

As described above, after the spectral sensitivity of one imaging device IS is measured, the spectral sensitivity of another imaging device IS can be measured according to the flow illustrated in FIG. 17.

<<Effects of Spectral Sensitivity Measuring Device>>

Figure 18A:
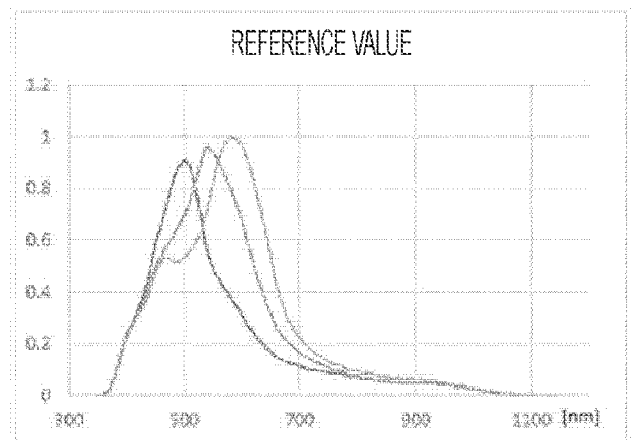
FIGS. 18A, 18B, and 18C are diagrams for explaining Effect 1 of the spectral sensitivity measuring device according to the sixth embodiment of the present technology.
Figure 18B:
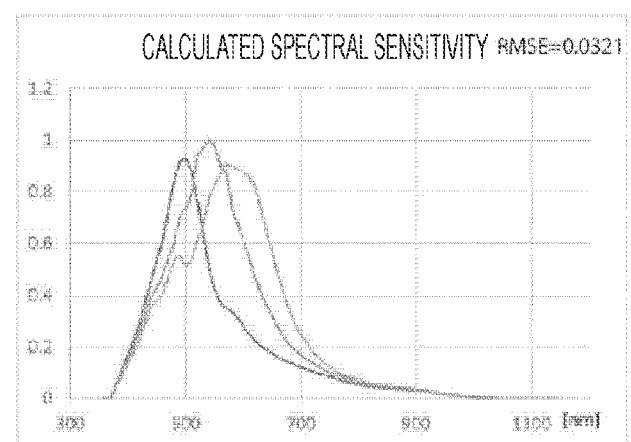
Figure 18C:
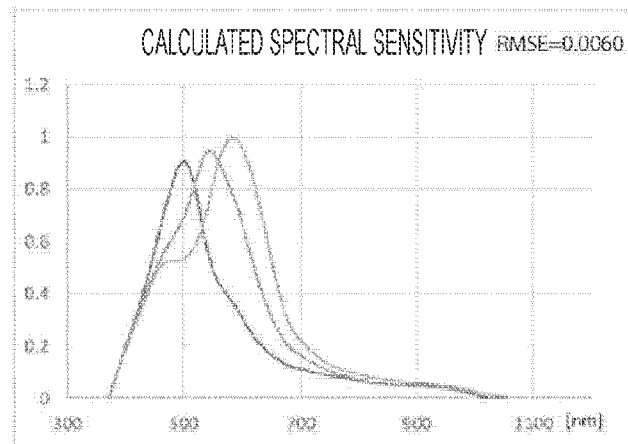
Figure 19A:
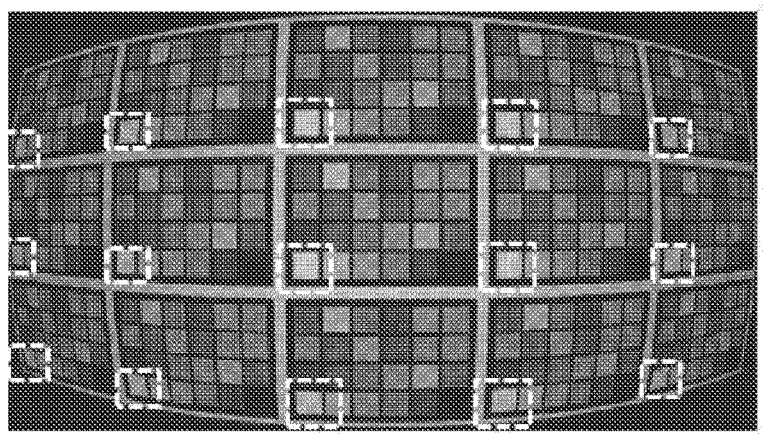
FIG. 19A and FIG. 19B are diagrams for explaining Effect 2 of the spectral sensitivity measuring device according to the sixth embodiment of the present technology.
Figure 19B:
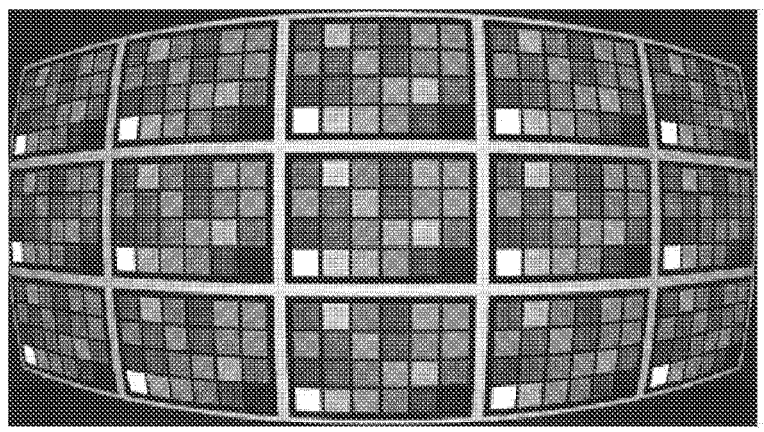

FIG. 18A is a graph illustrating, as a reference value, the spectral sensitivities at a certain measurement position (a position in a pixel to be imaged) in the imaging device IS which have been acquired, with high accuracy, by using different imaging devices (spectral sensitivity waveforms of three pixels in this example). FIG. 18B is a graph illustrating the spectral sensitivities of the imaging device IS calculated using a pixel value after the shading correction. FIG. 18C is a graph illustrating the spectral sensitivities of the imaging device IS calculated using the corrected pixel value yc. Note that the unit on the horizontal axis in FIGS. 18A, 18B, and 18C are nm.

As can be seen by comparing FIGS. 18A and 18B, the spectral sensitivities of the imaging device IS calculated using the pixel value after the shading correction has a relatively large deviation from the reference value, and the reproducibility is not high. In FIG. 18B, it can be seen that an error RMSE (Root Mean Squared Error) from FIG. 18A, that is an index indicating the level of reproducibility, is relatively large and the reproducibility is not high numerically.

As can be seen by comparing FIGS. 18A and 18C, the spectral sensitivities of the imaging device IS which have been calculated using the corrected pixel value yc have a relatively small deviation from the reference value, and the reproducibility is high. In FIG. 18C, it can be seen that the RMSE is relatively small and the reproducibility is high numerically.

The sensitivity of a lens or an imaging element varies depending on the position in a screen to be imaged, but it is desirable that there is no influence of shading in order to calculate the spectral sensitivity (particularly, in a case where the color region varies in a chart). In addition, although an average value is used for chart spectroscopy, actually, there is variation in an imaging plane due to unevenness in the imaging plane of a light source, unevenness in the imaging plane of a filter, unevenness in the imaging plane of a chart generation system, or the like. Since it is possible to correct these variations according to the spectral sensitivity measuring device of the sixth embodiment, the spectral sensitivity of the imaging device IS can be measured more accurately.

That is, according to the spectral sensitivity measuring device of the sixth embodiment, since the pixel value of the captured image of the chart ch can be acquired with higher accuracy, it is possible to measure the spectral sensitivity of the imaging device IS with higher accuracy.

The present method is also effective in a case where the spectral sensitivity is measured with one chart as described in Japanese Patent Application Laid-Open No. 2020-5053. In a case of one image, it is necessary to perform imaging so that a white color portion pixel value for shading correction is not saturated. However, in the present method capable of calculating the correction coefficient for each of individual color regions, it is sufficient that the pixel value for each of individual color regions is not saturated even if the white color portion pixel value for shading correction is saturated, and thus, it is possible to increase the exposure time or the light quantity accordingly. Therefore, the influence of noise at the time of pixel acquisition is reduced, and the measurement can be performed with high accuracy.

Therefore, a SN ratio can be improved according to the spectral sensitivity measuring device of the sixth embodiment.

<12. Spectral Sensitivity Measuring Device According to the Seventh Embodiment of the Present Technology>

Hereinafter, a spectral sensitivity measuring device according to the seventh embodiment of the present technology will be explained with reference to the drawings.

The spectral sensitivity measuring device according to the seventh embodiment has a configuration similar to the spectral sensitivity measuring device 10 according to the first embodiment except that the configuration of the processing system 1000 is partially different therebetween. Note that the spectral sensitivity measuring device according to the seventh embodiment may have the same configuration as any of the spectral sensitivity measuring device according to the modification of the first embodiment, the spectral sensitivity measuring devices 20-1 and 20-2 according to Examples 1 and 2 of the second embodiment, the spectral sensitivity measuring devices 30-1 and 30-2 according to Examples 1 and 2 of the third embodiment, the spectral sensitivity measuring devices 40-1 and 40-2 according to Examples 1 and 2 of the fourth embodiment, the spectral sensitivity measuring device 50 according to the fifth embodiment, and the spectral sensitivity measuring device described in Patent Document 1, except that the configuration of the processing system 1000 is partially different therebetween.

Meanwhile, in a case where the spectral sensitivity x of the imaging device IS is calculated using the Tikhonov regularization described above, Formula (F6) described below can be used.

[Math. 3]

$$x = \mathrm{argmin}_x \{\|Ax - s(b)\|_2^2 + \lambda \|Fx\|_2^2\} \tag{F6}$$

(where $\lambda$ is a regularization parameter, F is a differential matrix formed by a first-degree differential equation, A is a spectral characteristic of a chart, b is a pixel value of a captured image, and s is a pixel value after the correction of light quantity).

In Formula (F6) described above, the regularization parameter $\lambda$ is a contribution ratio of a condition that minimizes the luminance difference between adjacent wavelengths, and as the value thereof is larger, the smoothness of the spectroscopy between the adjacent wavelengths is emphasized, and a fine waveform tends to disappear, whereas, as the value thereof is smaller, it is possible to leave a fine waveform, but the sensitivity to noise increases and the waveform tends to be greatly disturbed.

The inventors have focused on a point that the spectral sensitivity cannot be accurately measured depending on the wavelength to be calculated since, conventionally, the same value is used as a value of $\lambda$ for the wavelength to be calculated.

Therefore, the inventors have developed a spectral sensitivity measuring device according to the seventh embodiment as a spectral sensitivity measuring device capable of accurately measuring the spectral sensitivity regardless of the wavelength to be calculated.

Specifically, in the spectral sensitivity measuring device according to the seventh embodiment, by making $\lambda$ variable depending on the wavelength to be calculated, the spectral sensitivity is measured using an appropriate $\lambda$ corresponding to the wavelength.

More specifically, when the spectral sensitivity x is calculated using Formula (F6) described above, the processing system 1000 (specifically, the spectral sensitivity calculation unit 1000b) of the spectral sensitivity measuring device according to the seventh embodiment can set the value of $\lambda$ in Formula (F6) described above according to the wavelength to be calculated.

Figure 20:
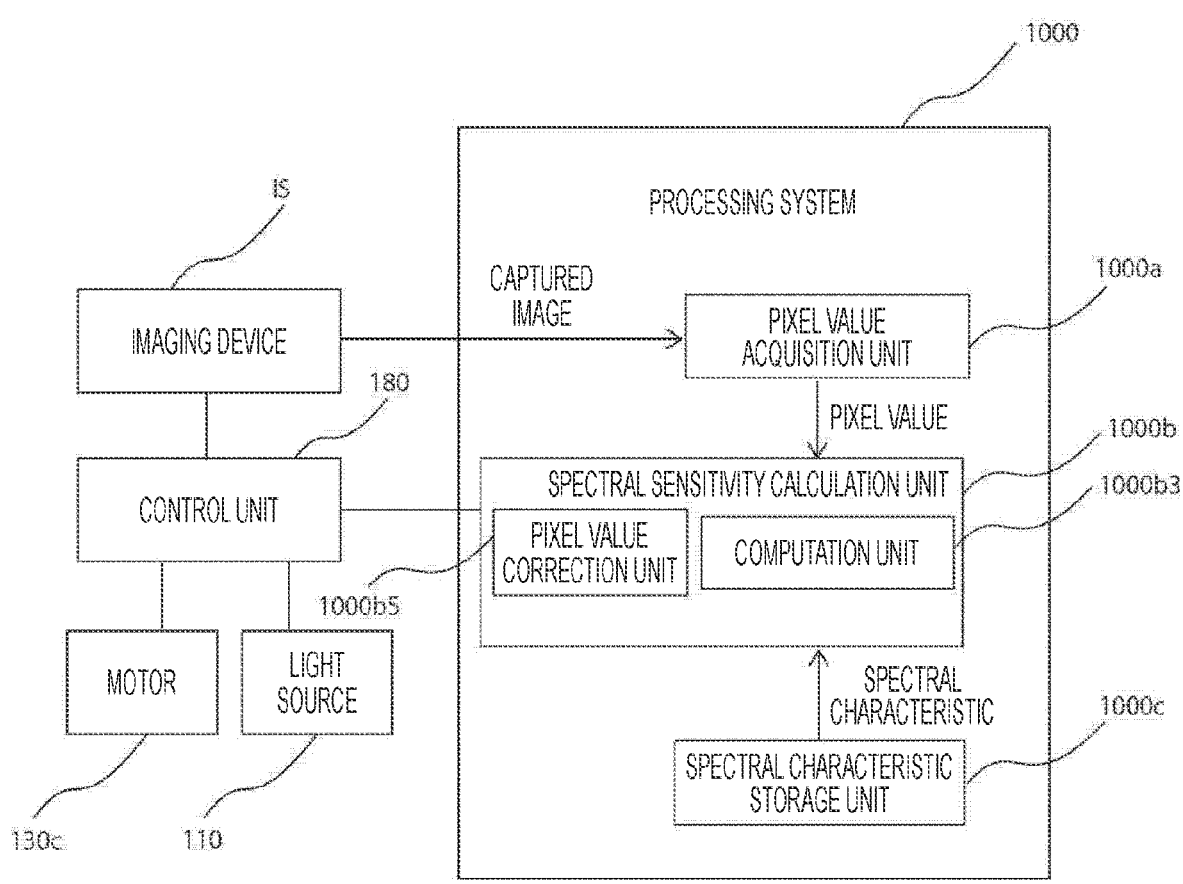
FIG. 20 is a block diagram illustrating functions of a processing system in a spectral sensitivity measuring device according to a seventh embodiment of the present technology.

FIG. 20 is a block diagram illustrating functions of the processing system 1000 in the spectral sensitivity measuring device according to the seventh embodiment.

As one example, in the spectral sensitivity measuring device according to the seventh embodiment, as illustrated in FIG. 20, the spectral sensitivity calculation unit 1000b of the processing system 1000 has a pixel value correction unit 1000b5 and a computation unit 1000b3. Note that the processing system 1000 may include the pixel value correction unit 1000b5 and the computation unit 1000b3 separately from the spectral sensitivity calculation unit.

As one example, the processing system 1000 (specifically, the spectral sensitivity calculation unit 1000b) sets a value of $\lambda$ in Formula (F6) described above according to the magnitude relation between the wavelength to be calculated and at least one threshold value Th.

The spectral sensitivity calculation unit 1000*b* of the processing system 1000 calculates the spectral sensitivity x using λ1 as λ in Formula (F6) described above in a case where the wavelength to be calculated is less than the threshold value Th, and calculates the spectral sensitivity x using λ2 different from λ1 as λ in Formula (F6) described above in a case where the wavelength to be calculated is equal to or more than the threshold value Th.

More specifically, as one example, the pixel value correction unit 1000*b*5 performs the shading correction described above on a pixel value for each color region from the pixel value acquisition unit 1000*a*. The pixel value correction unit 1000*b*5 outputs a pixel value s after the shading correction to the computation unit 1000*b*3. The computation unit 1000*b*3 calculates the spectral sensitivity x using the pixel value s after the shading correction which has been inputted from the pixel value correction unit 1000*b*5 and Formula (F6) described above. In the computation unit 1000*b*3, λ is set to λ1 (for example, 1) in a case where the wavelength to be calculated is less than the threshold value Th (for example, 700 nm), and λ is set to λ2 (for example, 10) in a case where the wavelength to be calculated is equal to or more than the threshold value Th (for example, 700 nm), to calculate the spectral sensitivity x using Formula (F6) described above.

According to the spectral sensitivity measuring device according to the seventh embodiment, when the spectral sensitivity is calculated using Formula (F6) described above using a pixel value for each color region of a chart, it is possible to change the regularization parameter λ of Formula (F6) described above according to the wavelength to be calculated. Thus, the spectral sensitivity can be calculated using λ appropriate to the wavelength, and consequently, the spectral sensitivity can be measured more accurately.

<13. Spectral Sensitivity Measuring Device According to the Eighth Embodiment of the Present Technology>

Hereinafter, a spectral sensitivity measuring device according to the eighth embodiment of the present technology will be explained with reference to the drawings.

Figure 21:
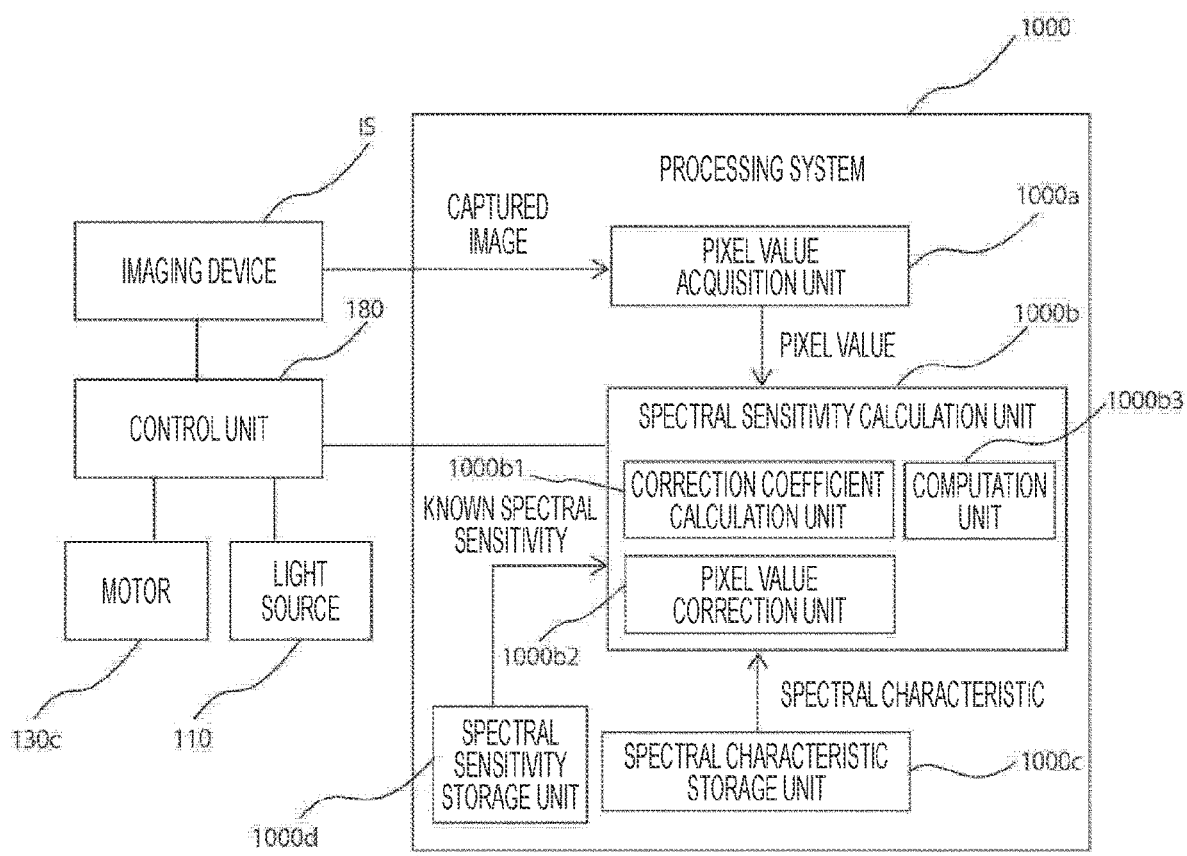
FIG. 21 is a block diagram illustrating functions of a processing system in a spectral sensitivity measuring device according to an eighth embodiment of the present technology.

As illustrated in FIG. 21, the spectral sensitivity measuring device according to the eighth embodiment has the same configuration as the spectral sensitivity measuring device 10 according to the first embodiment except that the configuration of the processing system 1000 is partially different therebetween. Note that the spectral sensitivity measuring device according to the eighth embodiment may have the same configuration as any of the spectral sensitivity measuring device according to the modification of the first embodiment, the spectral sensitivity measuring devices 20-1 and 20-2 according to Examples 1 and 2 of the second embodiment, the spectral sensitivity measuring devices 30-1 and 30-2 according to Examples 1 and 2 of the third embodiment, the spectral sensitivity measuring devices 40-1 and 40-2 according to Examples 1 and 2 of the fourth embodiment, the spectral sensitivity measuring device 50 according to the fifth embodiment, and the spectral sensitivity measuring device described in Patent Document 1, except that the configuration of the processing system 1000 is partially different therebetween.

As one example, the processing system 1000 in the spectral sensitivity measuring device according to the eighth embodiment, the spectral sensitivity calculation unit 1000*b* has the correction coefficient calculation unit 1000*b*1, the pixel value correction unit 1000*b*2, and the computation unit 1000*b*3. The processing system 1000 of the spectral sensitivity measuring device according to the eighth embodiment has a spectral sensitivity storage unit 1000*d*.

The processing system 1000 of the spectral sensitivity measuring device according to the eighth embodiment calculates the spectral sensitivity using Formula (F6) described above and Formula (F7) described below. When calculating the spectral sensitivity in Formula (F6) described above and Formula (F7) described below, the processing system 1000 can change a value of λ in Formula (F6) described above in accordance with the wavelength to be calculated.

$$s(b) = Cb \qquad (F7)$$

(where b is a pixel value of a captured image, s (b) is a pixel value after the correction of light quantity, and C is a correction coefficient.)

Specifically, the spectral sensitivity calculation unit 1000*b* of the processing system 1000 calculates the spectral sensitivity x using λ1 as λ in Formula (F6) described above in a case where the wavelength to be calculated is less than the threshold value Th, and calculates the spectral sensitivity x using λ2 different from λ1 as λ in Formula (F6) described above in a case where the wavelength to be calculated is equal to or more than the threshold value Th.

More specifically, as one example, the pixel value correction unit 1000*b*2 calculates a corrected pixel value by multiplying the pixel value for each color region from the pixel value acquisition unit 1000*a* by the correction coefficient C described above. In a case where the wavelength to be calculated is less than a threshold value Th (for example, 700 nm), the pixel value correction unit 1000*b*2 outputs a corrected pixel value corresponding to the wavelength to the computation unit 1000*b*3, and in a case where the wavelength is equal to or more than the threshold value Th (for example, 700 nm), the pixel value correction unit 1000*b*2 outputs a corrected pixel value corresponding to the wavelength to the computation unit 1000*b*3. The computation unit 1000*b*3 calculates the spectral sensitivity x using Formula (F6) described above and Formula (F7) described above where the corrected pixel value inputted from the pixel value acquisition unit 1000*a* is set to s (b) and λ=λ1. A value of λ1 is preferably 1, for example. The computation unit 1000*b*3 calculates the spectral sensitivity x using Formula (F6) described above and Formula (7) described above where the pixel value, after the correction, inputted from the pixel value acquisition unit 1000*a* is set to s (b) and λ=λ2. A value of λ2 is preferably 10, for example.

According to the spectral sensitivity measuring device according to the eighth embodiment, the spectral sensitivity is calculated using Formula (F6) described above and Formula (F7) described above using a pixel value for each color region of a chart, and it is possible to change the regularization parameter λ of Formula (F6) described above according to the wavelength to be calculated. Thus, the spectral sensitivity can be calculated using λ appropriate to the wavelength and the pixel value which has been corrected with high accuracy, and consequently, the spectral sensitivity can be measured further accurately.

Figure 22A:
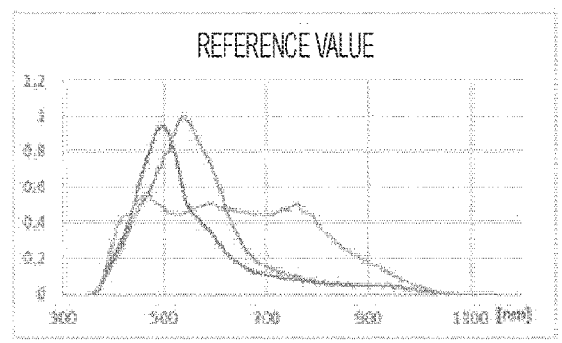
FIGS. 22A, 22B, and 22C are diagrams for explaining effects of the spectral sensitivity measuring device according to the eighth embodiment of the present technology.
Figure 22B:
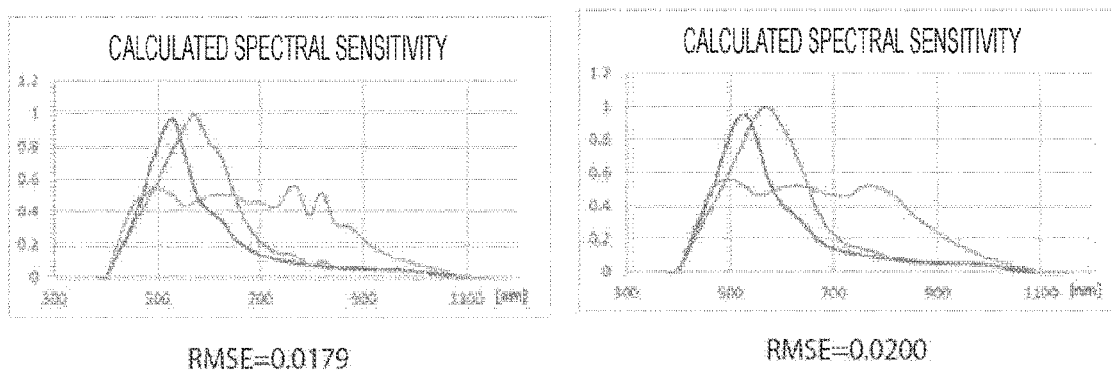
Figure 22C:
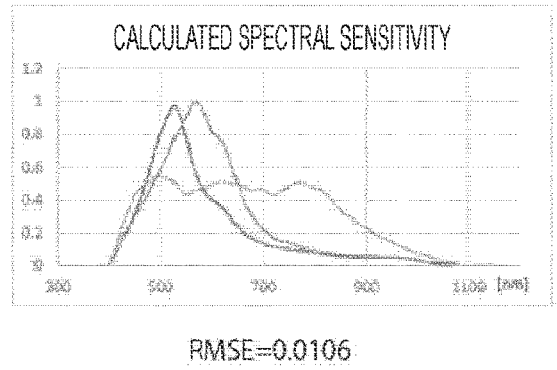

FIG. 22A is a graph illustrating, as a reference value, waveforms of the spectral sensitivities obtained from, for example, captured images of charts ch having three color regions which have been acquired with high accuracy using different imaging devices. A left diagram in FIG. 22B is a graph illustrating waveforms of the spectral sensitivities obtained in a case where λ is set to λ1 in each color region when the spectral sensitivities are calculated from the pixel values of the captured images of the charts ch which have been acquired by the imaging device IS in Formula (F6) described above and Formula (F7) described above. A right diagram in FIG. 22B is a graph illustrating waveforms of the spectral sensitivities in a case where λ is set to λ2 in each color region when the spectral sensitivities are calculated from the pixel values of the captured images of the charts ch acquired by the imaging device IS in Formula (F6) described above and Formula (F7) described above. FIG. 22C is a graph illustrating waveforms indicating the spectral sensitivities acquired by the spectral sensitivity measuring device according to the eighth embodiment. Note that the unit on the horizontal axis in FIGS. 22A, 22B, and 22C are nm.

When FIG. 22A is compared with the left diagram in FIG. 22B, it can be seen that the waveform illustrated in the left diagram of FIG. 22B is deformed under the influence of noise particularly on the long wavelength side (for example, 700 nm or more). In the left diagram of FIG. 22B, it can be seen that an error RMSE from the reference value which is an index indicating the level of reproducibility, is relatively high and the reproducibility is not high numerically.

When FIG. 22A is compared with the right diagram in FIG. 22B, it can be seen that the waveforms illustrated in the right diagram of FIG. 22B become too dull particularly on the short wavelength side (for example, less than 700 nm). In the right diagram of FIG. 22B, it can be seen that the RMSE is relatively high and the reproducibility is not high numerically.

When FIG. 22A is compared with FIG. 22C, it can be seen that the waveforms illustrated in FIG. 22C have high reproducibility on both the long wavelength side (for example, 700 nm or more) and the short wavelength side (for example, less than 700 nm). In FIG. 22C, it can be seen that the RMSE is relatively low and the reproducibility is high numerically.

Note that, in the spectral sensitivity measuring devices according to the seventh and eighth embodiments described above, at least one threshold value Th may be a plurality of threshold values Th. In this case, the processing system 1000 may calculate the spectral sensitivity using λ1 as λ in Formula (F6) described above in a case where the wavelength to be calculated is less than the minimum threshold value $Th_{min}$ among the plurality of threshold values Th, calculate the spectral sensitivity using λ2 different from λ1 as λ in Formula (F6) described above in a case where the wavelength to be calculated is equal to or more than the maximum threshold value $Th_{max}$ among the plurality of threshold values Th, and calculate the spectral sensitivity using λ3 different from λ1 as λ in Formula (F6) described above in a case where the wavelength to be calculated is equal to or more than the minimum threshold value $Th_{min}$ and less than the maximum threshold value $Th_{max}$. Therefore, the spectral sensitivity can be calculated using λ that is more appropriate to the wavelength to be calculated, and thus, the measurement accuracy of the spectral sensitivity can be further improved.

<14. Modification of the Present Technology>

Note that embodiments according to the present technology are not limited to the embodiments described above, and various modifications can be made without departing from the scope of the present technology.

In the spectral sensitivity measuring device according to the present technology, a configuration of the chart generation system can be changed as appropriate.

For example, the chart generation system may include a reflective chart plate. In this case, the reflective chart plate may be irradiated with light from a light source (for example, LED, OLED, laser, halogen lamp, xenon lamp, fluorescent lamp, or the like), and a chart generated by the reflected light may be imaged by the imaging device IS. Note that, in a case of the reflective chart plate, it is possible to output a predetermined wavelength by using a prism.

For example, the chart generation system may include a light emitting element array opposed to the imaging device. The light emitting element array includes light emitting elements arranged two-dimensionally (for example, LED, OLED, laser, and the like), and can emit a plurality of beams of light having different wavelengths.

For example, the chart generation system may include a liquid crystal panel opposed to the imaging device, and a light source (For example, LED, OLED, laser, halogen lamp, xenon lamp, fluorescent lamp, or the like) that irradiates the liquid crystal panel with a light. Note that the liquid crystal panel may be a transmission type or a reflection type.

In the spectral sensitivity measuring device 10 according to the first embodiment described above, the moving mechanism 130 is a rotary type, but is not limited thereto. For example, a translation type (linear type) such as the moving mechanism 230 of the spectral sensitivity measuring device 20-2 according to Example 2 of the second embodiment described above, may be used. Furthermore, the moving mechanism 130 has a configuration of moving the plurality of optical filters 120 with respect to a system including the light source 110 and the imaging device IS, but, instead of or in addition to this, may have a configuration of moving the system including the light source 110 and the imaging device IS with respect to the plurality of optical filters 120.

In the spectral sensitivity measuring device 20-2 according to Example 2 of the second embodiment described above, the moving mechanism 230 is a translation type (linear type), but is not limited thereto. For example, a rotary type such as the moving mechanism 130 of the spectral sensitivity measuring device 10 according to the first embodiment described above, may be used. Furthermore, the moving mechanism 230 has a configuration of moving the plurality of optical filters 220 with respect to a system including the light source 210 and the imaging device IS, but, instead of or in addition to this, may have a configuration of moving the system including the light source 210 and the imaging device IS with respect to the plurality of optical filters 220.

In a case where the moving mechanism is configured as a linear type, for example, a combination of a rack-and-pinion and a motor or a combination of a ball screw and a motor may be employed in addition to a linear motor.

In a case where the moving mechanism is configured as a rotary type, a member having a shape other than a circular plate shape may be used.

The number of optical filters can be appropriately increased or decreased.

The configurations of the respective embodiments, the respective examples, and the modifications described above may be combined with each other within a range in which there is no contradiction therebetween.

Furthermore, the present technology can also have the following configurations.

(1) A spectral sensitivity measuring device including:
 a chart generation system that generates a chart including at least one chart portion having at least one color region at a position opposed to an imaging device; and
 a processing system that calculates a spectral sensitivity of the imaging device on the basis of a captured image, by the imaging device, of the chart generated at the position opposed to the imaging device.

(2) The spectral sensitivity measuring device according to (1), in which the chart generation system includes a light source, and generates the chart between the imaging device and the light source.

(3) The spectral sensitivity measuring device according to (1) or (2), in which the chart generation system sequentially generates a plurality of the charts at a position opposed to the imaging device respectively.

(4) The spectral sensitivity measuring device according to any one of (1) to (3), in which the chart generation system has: a light source; and an optical filter group including a plurality of optical filters that is selectively disposed between the light source and the imaging device.

(5) The spectral sensitivity measuring device according to (4), in which the chart generation system further includes a moving mechanism that moves the optical filter group and a system including the imaging device and the light source relatively such that the plurality of optical filters is sequentially positioned between the imaging device and the light source respectively.

(6) The spectral sensitivity measuring device according to (5), in which the moving mechanism moves the plurality of optical filters in a direction substantially orthogonal to an arrangement direction of the imaging device and the light source.

(7) The spectral sensitivity measuring device according to (5) or (6), in which the moving mechanism has: a rotating member that has the plurality of optical filters disposed along a circumferential direction, and that is rotatable around an axis substantially parallel to an arrangement direction of the imaging device and the light source; and a driving unit that rotates the rotating member around the axis.

(8) The spectral sensitivity measuring device according to any one of (4) to (7), in which the chart generation system includes a diffusion plate disposed between the imaging device and each of the plurality of optical filters.

(9) The spectral sensitivity measuring device according to any one of (1) to (3), in which the chart generation system includes a variable wavelength light source having a variable light emission wavelength.

(10) The spectral sensitivity measuring device according to (9), in which the chart generation system has an optical filter group including a plurality of optical filters that is selectively disposed between the imaging device and the variable wavelength light source.

(11) The spectral sensitivity measuring device according to claim 10), in which the chart generation system further includes a moving mechanism that moves the optical filter group and a system including the imaging device and the variable wavelength light source relatively such that the plurality of optical filters is sequentially positioned between the imaging device and the variable wavelength light source respectively.

(12) The spectral sensitivity measuring device according to (11), in which the moving mechanism moves the plurality of optical filters in a direction substantially orthogonal to an arrangement direction of the imaging device and the variable wavelength light source.

(13) The spectral sensitivity measuring device according to (9), in which the variable wavelength light source is opposed to the imaging device.

(14) The spectral sensitivity measuring device according to (9), in which the chart generation system includes an optical waveguide member having an incident end connected to the variable wavelength light source and an emission end opposed to the imaging device.

(15) The spectral sensitivity measuring device according to (9), in which the chart generation system includes a plurality of optical waveguide members corresponding to a plurality of the imaging devices, and each of the plurality of optical waveguide members has an incident end connected to the variable wavelength light source and an emission end opposed to the imaging device corresponding thereto.

(16) The spectral sensitivity measuring device according to any one of (1) to (3), in which the chart generation system includes: a light source group including a plurality of light sources having different light emission wavelengths; and a moving mechanism that moves the light source group and the imaging device relatively such that the plurality of light sources and the imaging device are sequentially opposed to each other respectively.

(17) The spectral sensitivity measuring device according to any one of (1) to (3), in which the chart generation system includes: a light source group including a plurality of light sources having different light emission wavelengths; and a moving mechanism that moves the light source group and an imaging device group including a plurality of the imaging devices relatively such that the plurality of light sources and the plurality of imaging devices are sequentially opposed to each other respectively.

(18) The spectral sensitivity measuring device according to any one of (4) to (8) further including a control unit that controls an imaging time during which the imaging device images the chart, and/or a time during which the imaging device and the chart are opposed to each other, and/or at least one of a light emission intensity or a light emission time of the light source in accordance with a transmittance for each wavelength of each of the plurality of optical filters.

(19) The spectral sensitivity measuring device according to
the spectral sensitivity measuring device according to any one of (1) to (18), in which the processing system calculates a theoretical value yth of a pixel value of the captured image from Formula (1) described below, calculates a correction coefficient C from Formula (2) described below, and calculates a spectral sensitivity x from Formula (3) described below using a corrected pixel value yc obtained by multiplying an actual measurement value of a pixel value of a captured image, of the chart, different from the captured image by the imaging device, by the correction coefficient C:

$$y_{th} = Ax_a, \tag{1}$$

where $x_a$ is a spectral sensitivity of an imaging device with a known spectral sensitivity, and A is a spectral characteristic of a chart;

$$C = y_{th}/y_a, \tag{2}$$

where $y_a$ is a pixel value of a captured image by an imaging device with a known spectral sensitivity; and $$y_c = Ax. \quad (3)$$

where A is a spectral characteristic of a chart.

(20) The spectral sensitivity measuring device according to (19), in which the spectral sensitivity is x calculated in Formula (4) described below and Formula (5) described below, and the processing system can set a value of $\lambda$ in Formula (4) described below in accordance with a wavelength to be calculated when calculating the spectral sensitivity in Formula (4) described below and Formula (5) described below:

$$x = \mathrm{argmin}\_x\{\|\|Ax - s[(b)\|]\_2^\wedge 2 + \lambda\{\|\|Fx\|\|\_2^\wedge 2\} \quad (4)$$

$$s(b) = Cb. \quad (5)$$

where $\lambda$ is a regularization parameter, F is a differential matrix formed by a first-degree differential equation, A is a spectral characteristic of a chart, and b is a pixel value of a captured image.

(21) The spectral sensitivity measuring device according to any one of (1) to (20), in which the spectral sensitivity is x calculated in Formula (6) described below, and the processing system can set a value of $\lambda$ in Formula (6) described below in accordance with a wavelength to be calculated when calculating the spectral sensitivity in Formula (6) described below:

$$x = \mathrm{argmin}\_x\{\|\|Ax - [s(b)\|]\_2^\wedge 2 + \lambda\|\|Fx\|\|\_2^\wedge 2\} \quad (6)$$

where $\lambda$ is a regularization parameter, F is a differential matrix formed by a first-degree differential equation, A is a spectral characteristic of a chart, b is a pixel value of a captured image, and s is a pixel value after a correction of light quantity.

(22) The spectral sensitivity measuring device according to (20) or (21), in which the processing system sets a value of the abovementioned $\lambda$ in accordance with a magnitude relation between a wavelength to be calculated and at least one threshold value Th.

(23) The spectral sensitivity measuring device according to (22), in which the processing system calculates the spectral sensitivity using $\lambda 1$ as the abovementioned $\lambda$ in a case where a wavelength to be calculated is less than the threshold value Th, and calculates the spectral sensitivity using $\lambda 2$ different from the abovementioned $\lambda 1$ as the abovementioned $\lambda$ in a case where a wavelength to be calculated is equal to or more than the threshold value Th.

(24) The spectral sensitivity measuring device according to (22), in which the at least one threshold value Th includes a plurality of threshold values Th, the processing system calculates the spectral sensitivity using $\lambda 1$ as the abovementioned $\lambda$ in a case where a wavelength to be calculated is less than a minimum threshold value $Th_{min}$ among the plurality of threshold values Th, calculates the spectral sensitivity using $\lambda 2$ different from the abovementioned $\lambda 1$ as the abovementioned $\lambda$ in a case where a wavelength to be calculated is equal to or more than a maximum threshold value $Th_{max}$ among the plurality of threshold values Th, and calculates the spectral sensitivity using $\lambda 3$ different from the abovementioned $\lambda 1$ as the abovementioned $\lambda$ in a case where a wavelength to be calculated is equal to or more than the minimum threshold value $Th_{min}$ as well as less than the maximum threshold value $Th_{max}$.

(25) The spectral sensitivity measuring device according to any one of (1) to (24), in which the processing system includes a pixel value acquisition unit that acquires a pixel value of the captured image, and a spectral sensitivity calculation unit that calculates the spectral sensitivity on the basis of a spectral characteristic of the chart and the pixel value acquired by the pixel value acquisition unit.

(26) The spectral sensitivity measuring device according to any one of (1) to (25), in which the at least one color region includes a plurality of color regions.

(27) The spectral sensitivity measuring device according to any one of (1) to (3), in which the chart generation system includes a light emitting element array opposed to the imaging device.

(28) The spectral sensitivity measuring device according to any one of (1) to (3), in which the chart generation system includes: a liquid crystal panel opposed to the imaging device; and a light source that irradiates the liquid crystal panel with a light.

(29) A spectral sensitivity measuring method including:
a step of generating a chart including at least one chart portion having at least one color region at a position opposed to an imaging device;
a step of imaging the chart generated at the position opposed to the imaging device by the imaging device;
a step of acquiring a pixel value of the captured image of the chart imaged in the imaging step; and
a step of calculating a spectral sensitivity of the imaging device on the basis of a spectral characteristic of the chart and the pixel value acquired in the acquiring step.

(30) The spectral sensitivity measuring device according to (29), in which the chart generation system includes a light source, and generates the chart between the imaging device and the light source.

(31) The spectral sensitivity measuring method according to (29) or (30), in which, in the generating step, a plurality of the charts is sequentially generated at a position opposed to the imaging device respectively.

REFERENCE SIGNS LIST

10, 20-1, 20-2, 30-1, 30-2, 40-1, 40-2, 50 Spectral sensitivity measuring device
100, 200-1, 200-2, 300-1, 300-2, 400-1, 400-2 Chart generation system
110, 410, 410-1 to 410-8 Light source
410G Light source group
210 Variable wavelength light source
120, 120-1 to 120-8, 220-1 to 220-3 Optical filter
120G Optical filter group
130c Motor (driving unit)
130, 230, 430-1, 430-2 Moving mechanism
140 Diffusion plate
180 Control unit
360, 360-1, 360-2 Optical fiber cable (optical waveguide member)
1000 Processing system 1000a Pixel value acquisition unit
1000b Spectral sensitivity calculation unit
IS, IS1 to IS10 Imaging device
ISG Imaging device group
ch Chart

The invention claimed is:

1. A spectral sensitivity measuring device, comprising:
a first imaging device;
a chart generation system that includes:
  a light source;
  an optical filter group between the light source and the first imaging device, wherein the optical filter group includes a plurality of optical filters;
  a moving mechanism configured to move the optical filter group, the first imaging device, and the light source such that each of the plurality of optical filters is at a respective sequential position between the first imaging device and the light source;
  a control unit configured to sequentially generate a plurality of charts that corresponds to the plurality of optical filters, wherein
  at least one chart portion of each of the plurality of charts includes a color region,
  the each of the plurality of charts is at a position opposite to a position of the first imaging device, and
  the first imaging device is configured to capture a respective image of the each of the plurality of charts; and
a processing system configured to calculate a spectral sensitivity of the first imaging device based on the respective image of the each of the plurality of charts.

2. The spectral sensitivity measuring device according to claim 1, wherein the control unit is further configured to generate the each of the plurality of charts between the first imaging device and the light source.

3. The spectral sensitivity measuring device according to claim 1, wherein
the moving mechanism is further configured to move the plurality of optical filters in a direction substantially orthogonal to an arrangement direction of the first imaging device and the light source.

4. The spectral sensitivity measuring device according to claim 1, wherein the moving mechanism comprises:
a rotating member that includes the plurality of optical filters along a circumferential direction, wherein
  the rotating member is rotatable around an axis substantially parallel to an arrangement direction of the first imaging device and the light source; and
a driving unit configured to rotate the rotating member around the axis.

5. The spectral sensitivity measuring device according to claim 1, wherein the chart generation system further includes a diffusion plate between the first imaging device and the each of the plurality of optical filters.

6. The spectral sensitivity measuring device according to claim 1, wherein
the light source is a variable wavelength light source having a variable light emission wavelength.

7. The spectral sensitivity measuring device according to claim 6, wherein the optical filter group between the first imaging device and the variable wavelength light source.

8. The spectral sensitivity measuring device according to claim 7, wherein the moving mechanism is further configured to move the optical filter group, the first imaging device, and the variable wavelength light source relatively such that the each of the plurality of optical filters is at the respective sequential position between the first imaging device and the variable wavelength light source.

9. The spectral sensitivity measuring device according to claim 8, wherein
the moving mechanism is further configured to move the plurality of optical filters in a direction substantially orthogonal to an arrangement direction of the first imaging device and the variable wavelength light source.

10. The spectral sensitivity measuring device according to claim 6, wherein a position of the variable wavelength light source is opposite to the position of the first imaging device.

11. The spectral sensitivity measuring device according to claim 6, wherein
the chart generation system further includes an optical waveguide member, and
the optical waveguide member includes an incident end connected to the variable wavelength light source, and an emission end opposite to the first imaging device.

12. The spectral sensitivity measuring device according to claim 6, wherein
the chart generation system further includes a plurality of optical waveguide members corresponding to a plurality of imaging devices,
the plurality of imaging devices includes the first imaging device,
a respective incident end of each of the plurality of optical waveguide members is connected to the variable wavelength light source, and
each of the plurality of imaging devices is at a position opposite to a respective emission end of the each of the plurality of optical waveguide members.

13. The spectral sensitivity measuring device according to claim 1, wherein
the chart generation system further includes a light source group,
the light source group includes a plurality of light sources,
the plurality of light sources is associated with a plurality of light emission wavelengths,
the plurality of light sources includes the light source, and
the moving mechanism is further configured to move the light source group and the first imaging device relatively such that a respective position of each of the plurality of light sources is opposite to the first imaging device.

14. The spectral sensitivity measuring device according to claim 1, further comprising an imaging device group that includes a plurality of imaging devices, wherein
the chart generation system further includes a light source group,
the light source group includes a plurality of light sources having different light emission wavelengths,
the plurality of light sources includes the light source,
the plurality of imaging devices includes the first imaging device, and
the moving mechanism is further configured to move the light source group and the imaging device group such that the plurality of light sources is opposite to the plurality of imaging devices.

15. The spectral sensitivity measuring device according to claim 1, wherein
the control unit is further configured to control at least one of:
  an imaging time period,
  a specific time period,
  a light emission intensity of the light source, or
  a light emission time of the light source, the first imaging device is further configured to capture, in the imaging time period, the each of the plurality of charts, the position of the first imaging device is opposite to a position of the each of the plurality of charts in the specific time period, and the light emission intensity of the light source and the light emission time of the light source are based on a transmittance value for a respective wavelength of each of the plurality of optical filters.

16. The spectral sensitivity measuring device according to claim 1, wherein the processing system is further configured to:

calculate a theoretical value $y_{th}$ of a first pixel value of the respective image from Formula (1), $$y_{th} = Ax_a \quad (1)$$

where $x_a$ is a spectral sensitivity of a second imaging device, and A is a spectral characteristic of a specific chart of the plurality of charts;

calculate a correction coefficient C from Formula (2), $$C = y_{th}/y_a \quad (2)$$

where $y_a$ is a second pixel value of a specific image of the specific chart; and calculate the spectral sensitivity of the first imaging device from Formula (3) based on a corrected pixel value $y_c$, wherein $y_c$ is based on a multiplication of the correction coefficient C with a measurement value of the second pixel value of the specific image, and the specific image is captured by the second imaging device, and $$y_c = Ax \quad (3)$$

where A is the spectral characteristic of the specific chart and x is the spectral sensitivity of the first imaging device.

17. The spectral sensitivity measuring device according to claim 16, wherein the processing system is further configured to:

calculate the spectral sensitivity x of the first imaging device in Formula (4) and Formula (5); and set a value of λ in Formula (4) based on a wavelength calculated in a case where the spectral sensitivity x is calculated in Formula (4), $$x = \mathrm{argmin}_x\{\|Ax - s(b)\|_2^2 + \lambda \|Fx\|_2^2\} \quad (4)$$

$$s(b) = Cb \quad (5)$$

where λ is a regularization parameter, F is a differential matrix of a first-degree differential equation, A is the spectral characteristic of the specific chart, and b is the first pixel value of the respective image.

18. The spectral sensitivity measuring device according to claim 1, wherein the processing system is further configured to:

calculate the spectral sensitivity of the first imaging device Formula (6); and set a value of λ in Formula (6) based on a wavelength calculated in a case where the spectral sensitivity is calculated in Formula (6), $$x = \mathrm{argmin}_x\{\|Ax - s(b)\|_2^2 + \lambda \|Fx\|_2^2\} \quad (6)$$

where x is the spectral sensitivity of the first imaging device, λ is a regularization parameter, F is a differential matrix of a first-degree differential equation, A is a spectral characteristic of a specific chart of the plurality of charts, b is a first pixel value of the respective image, and s is a second pixel value of the respective image after a correction of light quantity.

19. The spectral sensitivity measuring device according to claim 18, wherein the processing system is further configured to set the value of λ in Formula (6) based on a magnitude relation between the wavelength and a threshold value $T_h$.

20. The spectral sensitivity measuring device according to claim 19, wherein the processing system is further configured to calculate the spectral sensitivity of the first imaging device based on one of λ1 as λ in Formula (6) described above in a case where the wavelength is less than the threshold value $T_h$, or λ2, different from λ1, as λ in Formula (6) in a case where the wavelength is equal to or more than the threshold value $T_h$.

21. The spectral sensitivity measuring device according to claim 19, wherein a plurality of threshold values includes the threshold value Th, and the processing system is further configured to calculate the spectral sensitivity of the first imaging device based on one of λ1 as λ in Formula (6) in a case where the wavelength is less than a minimum threshold value $Th_{min}$ among the plurality of threshold values, λ2, different from λ1, as λ in Formula (6) in a case where the wavelength is equal to or more than a maximum threshold value $Th_{max}$ of the plurality of threshold values, or λ3, different from λ1, as λ in Formula (6) in a case where the wavelength is equal to or more than the minimum threshold value $Th_{min}$ and less than the maximum threshold value $Th_{max}$.

22. The spectral sensitivity measuring device according to claim 1, wherein the processing system includes:

a pixel value acquisition unit configured to acquire a pixel value of the respective image, and a spectral sensitivity calculation unit configured to calculate the spectral sensitivity of the first imaging device based on a respective spectral characteristic of the each of the plurality of charts and the pixel value of the respective image.

23. The spectral sensitivity measuring device according to claim 1, wherein the color region includes a plurality of color regions.

24. The spectral sensitivity measuring device according to claim 1, wherein the chart generation system further includes a light emitting element array at a position opposite to the position of the first imaging device.

25. The spectral sensitivity measuring device according to claim 1, wherein
the chart generation system further includes a liquid crystal panel opposed to at a position opposite to the position of the first imaging device, and
the light source is configured to irradiate the liquid crystal panel with light.

26. A spectral sensitivity measuring method, comprising:
in a spectral sensitivity measuring device that includes an imaging device, a light source, and a plurality of optical filters:
moving the plurality of optical filters, the imaging device, and the light source such that each of the plurality of optical filters is at a respective sequential position between the imaging device and the light source;
sequentially generating a plurality of charts that corresponds to the plurality of optical filters, wherein
at least one chart portion of each of the plurality of charts includes a color region, and
the each of the plurality of charts is at a position opposite to a position of the imaging device;
capturing, by the imaging device, a respective image of the each of the plurality of charts;
acquiring a pixel value of the respective image of the each of the plurality of charts; and
calculating a spectral sensitivity of the imaging device based on a respective spectral characteristic of the each of the plurality of charts and the pixel value.

* * * * *